United States Patent
Cooke, Jr. et al.

(10) Patent No.: US 12,552,802 B2
(45) Date of Patent: Feb. 17, 2026

(54) FUSED [7,5] BICYCLIC PYRAZOLE DERIVATIVES AND METHODS OF USE THEREOF FOR THE TREATMENT OF HERPESVIRUSES

(71) Applicant: Merck Sharp & Dohme LLC, Rahway, NJ (US)

(72) Inventors: Andrew J. Cooke, Jr., Doylestown, PA (US); Jeffrey W. Schubert, North Wales, PA (US); Jason W. Skudlarek, Audubon, PA (US)

(73) Assignee: Merck Sharpe & Dohme LLC, Rahway, NJ (US)

( * ) Notice: Subject to any disclaimer, the term of this patent is extended or adjusted under 35 U.S.C. 154(b) by 449 days.

(21) Appl. No.: 18/256,980

(22) PCT Filed: Dec. 9, 2021

(86) PCT No.: PCT/US2021/062507
§ 371 (c)(1),
(2) Date: Jun. 12, 2023

(87) PCT Pub. No.: WO2022/132545
PCT Pub. Date: Jun. 23, 2022

(65) Prior Publication Data
US 2024/0051963 A1    Feb. 15, 2024

Related U.S. Application Data

(60) Provisional application No. 63/125,748, filed on Dec. 15, 2020.

(51) Int. Cl.
*C07D 487/04* (2006.01)
*A61K 31/517* (2006.01)
*A61P 31/22* (2006.01)

(52) U.S. Cl.
CPC .......... *C07D 487/04* (2013.01); *A61K 31/517* (2013.01); *A61P 31/22* (2018.01)

(58) Field of Classification Search
CPC ...... C07D 487/04; A61P 31/22; A61K 31/517
See application file for complete search history.

(56) References Cited

U.S. PATENT DOCUMENTS

| | | |
|---|---|---|
| 2005/0165032 A1 | 7/2005 | Norman et al. |
| 2007/0259853 A1 | 11/2007 | Xia et al. |
| 2015/0290235 A1 | 10/2015 | Gros et al. |
| 2019/0127349 A1 | 5/2019 | Cumming et al. |

FOREIGN PATENT DOCUMENTS

WO    WO-2008115705 A2 *    9/2008    .............. A61P 37/00

OTHER PUBLICATIONS

Poole, Claudette L. et al., Antiviral Therapies for Herpesviruses: Current Agents and New Directions, Clinical Therapeutics, 2018, 1282-1298, 40(8).
Allen, Scott H. et al., Synthesis of C-6 substituted pyrazolo[1,5-a]pyridines with potent activity against herpesviruses, Bioorganic & Medicinal Chemistry, 14, 944-954, 2006.

* cited by examiner

*Primary Examiner* — Sarah Pihonak
*Assistant Examiner* — Mikhail O'Donnel Robinson
(74) *Attorney, Agent, or Firm* — Jeffrey P. Bergman; Catherine Fitch

(57) ABSTRACT

The present invention relates to novel Fused [7,5] Bicyclic Pyrazole Derivatives of Formula (I): (I) and pharmaceutically acceptable salts thereof, wherein X, R1, R2, R3, and R4 are as defined herein. The present invention also relates to compositions comprising at least one Fused [7,5] Bicyclic Pyrazole Derivative, and methods of using the Fused [7,5] Bicyclic Pyrazole Derivatives for treating or preventing a herpesvirus infection in a patient.

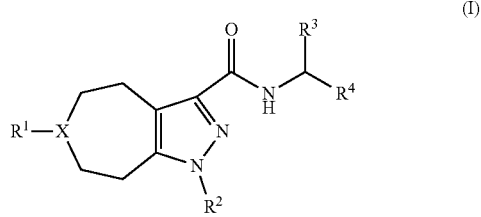

17 Claims, No Drawings

FUSED [7,5] BICYCLIC PYRAZOLE DERIVATIVES AND METHODS OF USE THEREOF FOR THE TREATMENT OF HERPESVIRUSES

CROSS REFERENCE TO RELATED APPLICATIONS

This application is a U.S. National Phase application under 35 U.S.C. § 371 of PCT Application No. PCT/US2021/062507, filed Dec. 9, 2021, which claims priority from U.S. Ser. No. 63/125,748 filed Dec. 15, 2020.

FIELD OF THE INVENTION

The present invention relates to novel Fused [7,5] Bicyclic Pyrazole Derivatives, compositions comprising at least one Fused [7,5] Bicyclic Pyrazole Derivative, and methods of using the Fused [7,5] Bicyclic Pyrazole Derivatives for treating or preventing herpesvirus infection in a patient.

BACKGROUND OF THE INVENTION

Human herpes viruses (Herpesviridae) are responsible for causing a wide variety of diseases in humans. Infection with herpes viruses can occur early in life and by adulthood over 95% of the population is infected by at least one herpes virus. These viruses establish a persistent life-long infection through viral latency in neuronal, lymphoid, or myeloid cells. Recurrent episodes of herpes virus disease can be triggered by numerous stimuli, including concurrent viral infections, stress, fatigue, allergies, pregnancy, sunlight or fever. Herpes virus infection in immune competent individuals generally causes mild self-limiting disease, such as: oral (HSV-1), and genital (HSV-2) ulcers, chicken pox (VZV), flu-like syndrome (CMV), and mononucleosis (EBV). In immunocompromised individuals however, primary infection with, or reactivation of an existing herpes virus infection is a major cause of disease and death. Key at-risk immunocompromised populations include patients undergoing solid organ or stem cell transplants, individuals with HIV/AIDS, and ICU patients.

Herpesviridae comprise a diverse family of double-stranded DNA viruses that are classified into three subfamilies (i.e., α, β, and γ) based upon biological characteristics such as cell tropism, diseases caused, viral life-cycle, and site of viral persistence and latency. The family consists of eight members: Herpes Simplex Virus type 1 and 2 (HSV-1, HSV-2), Varicella Zoster Virus (VZV), Epstein-Barr virus (EBV), Cytomegalovirus (CMV), and human herpes viruses 6-8 (HHV6-8).

α-herpes viruses include herpes simplex virus types 1 and 2 (HSV1 and HSV2), and varicella-zoster virus (VZV). HSV1 causes orofacial lesions, commonly known as fever blisters or cold sores. Approximately 30% of the United States population suffers from recurrent episodes of HSV1. HSV2, which is less common than HSV1, causes genital lesions. Primary infection with VZV causes varicella, commonly known as chicken pox. Reactivation of latent VZV manifests as herpes zoster or shingles. Cytomegalovirus (CMV) is a prototypical β herpes virus. Seroprevalance to CMV in the adult population is ~60%, but certain endemic areas of the world have rates closer to 100%. CMV represents the leading viral cause of morbidity and mortality in at-risk immunocompromised patients. EBV, a γ herpes virus, causes infectious mononucleosis and is responsible for lymphoid cancers such as Burkitt's and Hodgkin's lymphoma.

Presently, there is no cure for herpes. Medicines have been developed that can prevent or shorten outbreaks, but there is a need for improved therapies for treating herpes virus infection and inhibiting viral replication. The current standard of care for immunocompromised patients at risk for herpes virus disease is pre-emptive treatment with high-dose nucleoside/nucleotide analog drugs such as acyclovir, (val)ganciclovir, and cidofovir, all of which target the viral DNA polymerase. In general, current treatments are virus specific (not broad spectrum), and in the case of (val)ganciclovir and cidofovir cannot be administered prophylactically due to dose-related toxicities including bone marrow suppression and renal toxicity. Although efficacious in many settings, the current nucleos(t)ide drugs are also limited by drug-resistant viral variants and existing cross-resistant variants which may lead to treatment failure. Therefore, there is an urgent medical need for improved, well-tolerated anti-herpes agents.

SUMMARY OF THE INVENTION

In one aspect, the present invention provides Compounds of Formula (I)

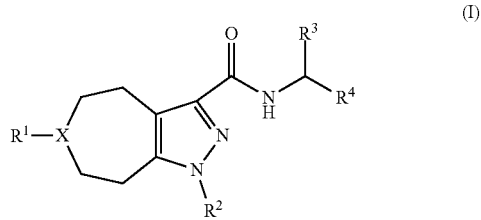

or a pharmaceutically acceptable salt thereof,
wherein:
  X is N or $C(R^5)$;
  $R^1$ is —$(C_1$-$C_6$ alkylene)-(4 to 7-membered monocyclic heterocycloalkyl), or —$(C_1$-$C_6$ alkylene)-(5 or 6-membered monocyclic heteroaryl), wherein said 4 to 7-membered monocyclic heterocycloalkyl group, and said 5 or 6-membered monocyclic heteroaryl group, can each be optionally substituted with one or more $R^A$ groups, which can be the same or different;
  $R^2$ is selected from $C_1$-$C_6$ alkyl, $C_3$-$C_6$ monocyclic cycloalkyl, —$(C_1$-$C_6$ alkylene)-$N(R^6)_2$, $C_1$-$C_6$ haloalkyl, and $C_1$-$C_6$ hydroxyalkyl, wherein said $C_3$-$C_6$ monocyclic cycloalkyl group can be optionally substituted with one or more $R^B$ groups, which can be the same or different;
  $R^3$ is H or $C_1$-$C_6$ alkyl;
  $R^4$ is phenyl, which can be optionally substituted with one or more groups, which can be the same or different, and are selected from: halo, CN, and $NO_2$;
  $R^5$ is selected from H, $C_1$-$C_6$ alkyl and —OH;
  each occurrence of $R^6$ is independently selected from H, $C_1$-$C_6$ alkyl, and —$C(O)R^7$;
  each occurrence of $R^7$ is independently selected from H, $C_1$-$C_6$ alkyl, and $C_3$-$C_6$ monocyclic cycloalkyl, wherein $C_3$-$C_6$ monocyclic cycloalkyl can be optionally substituted with a group selected from $C_1$-$C_6$ alkyl, halo, and —OH;
  each occurrence of $R^A$ is independently selected from oxo, halo and $C_1$-$C_6$ alkyl; and each occurrence of $R^B$ is independently selected from $C_1$-$C_6$ alkyl, —OH, —O—($C_1$-$C_6$ alkyl), halo, —$C_1$-$C_6$ haloalkyl, phenyl, and —$C_1$-$C_6$ hydroxyalkyl.

The Compounds of Formula (I) (also referred to herein as the "Fused [7,5] Bicyclic Pyrazole Derivatives"), and pharmaceutically acceptable salts thereof can be useful, for example, for inhibiting herpesvirus viral replication or activity, and for treating or preventing herpesvirus infection in a patient. Without being bound by any specific theory, it is believed that the Fused [7,5] Bicyclic Pyrazole Derivatives inhibit herpesvirus viral replication by inhibiting herpesvirus polymerase.

Accordingly, the present invention provides methods for treating or preventing herpesvirus infection in a patient, comprising administering to the patient an effective amount of at least one Fused [7,5] Bicyclic Pyrazole Derivative.

The details of the invention are set forth in the accompanying detailed description below.

Although any methods and materials similar to those described herein can be used in the practice or testing of the present invention, illustrative methods and materials are now described. Other embodiments, aspects and features of the present invention are either further described in or will be apparent from the ensuing description, examples and appended claims.

DETAILED DESCRIPTION OF THE INVENTION

The present invention relates to novel Fused [7,5] Bicyclic Pyrazole Derivatives, compositions comprising at least one Fused [7,5] Bicyclic Pyrazole Derivative, and methods of using the Fused [7,5] Bicyclic Pyrazole Derivatives for treating or preventing herpesvirus infection in a patient.

Definitions and Abbreviations

The terms used herein have their ordinary meaning and the meaning of such terms is independent at each occurrence thereof. That notwithstanding and except where stated otherwise, the following definitions apply throughout the specification and claims. Chemical names, common names, and chemical structures may be used interchangeably to describe the same structure. If a chemical compound is referred to using both a chemical structure and a chemical name and an ambiguity exists between the structure and the name, the structure predominates. These definitions apply regardless of whether a term is used by itself or in combination with other terms, unless otherwise indicated. Hence, the definition of "alkyl" applies to "alkyl" as well as the "alkyl" portions of "hydroxyalkyl," "haloalkyl," "—O-alkyl," etc. . . .

As used herein, and throughout this disclosure, the following terms, unless otherwise indicated, shall be understood to have the following meanings:

A "patient" is a human or non-human mammal. In one embodiment, a patient is a human.

The term "effective amount" as used herein, refers to an amount of Fused [7,5] Bicyclic Pyrazole Derivative and/or an additional therapeutic agent, or a composition thereof that is effective in producing the desired therapeutic, ameliorative, inhibitory or preventative effect when administered to a patient suffering from a viral infection or virus-related disorder. In the combination therapies of the present invention, an effective amount can refer to each individual agent or to the combination as a whole, wherein the amounts of all agents administered are together effective, but wherein the component agent of the combination may not be present individually in an effective amount.

The term "preventing," as used herein with respect to an herpesvirus viral infection or herpesvirus-virus related disorder, refers to reducing the likelihood of herpesvirus infection.

The term "alkyl," as used herein, refers to an aliphatic hydrocarbon group having one of its hydrogen atoms replaced with a bond. An alkyl group may be straight or branched and contain from about 1 to about 20 carbon atoms. In one embodiment, an alkyl group contains from about 1 to about 12 carbon atoms. In different embodiments, an alkyl group contains from 1 to 6 carbon atoms ($C_1$-$C_6$ alkyl) or from about 1 to about 4 carbon atoms ($C_1$-$C_4$ alkyl). Non-limiting examples of alkyl groups include methyl, ethyl, n-propyl, isopropyl, n-butyl, sec-butyl, isobutyl, tert-butyl, n-pentyl, neopentyl, isopentyl, n-hexyl, isohexyl and neohexyl. An alkyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —$NH_2$, —NH(alkyl), —N(alkyl)$_2$, NH(cycloalkyl), —O—C(O)-alkyl, —O—C(O)-aryl, —O—C(O)-cycloalkyl, —C(O)OH and —C(O)O-alkyl. In one embodiment, an alkyl group is linear. In another embodiment, an alkyl group is branched. Unless otherwise indicated, an alkyl group is unsubstituted.

The term "alkenyl," as used herein, refers to an aliphatic hydrocarbon group containing at least one carbon-carbon double bond and having one of its hydrogen atoms replaced with a bond. An alkenyl group may be straight or branched and contain from about 2 to about 15 carbon atoms. In one embodiment, an alkenyl group contains from about 2 to about 12 carbon atoms. In another embodiment, an alkenyl group contains from about 2 to about 6 carbon atoms. Non-limiting examples of alkenyl groups include ethenyl, propenyl, n-butenyl, 3-methylbut-2-enyl, n-pentenyl, octenyl and decenyl. An alkenyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —$NH_2$, —NH(alkyl), —N(alkyl)$_2$, —NH(cycloalkyl), —O—C(O)-alkyl, —O—C(O)-aryl, —O—C(O)-cycloalkyl, —C(O)OH and —C(O)O-alkyl. The term "$C_2$-$C_6$ alkenyl" refers to an alkenyl group having from 2 to 6 carbon atoms. Unless otherwise indicated, an alkenyl group is unsubstituted.

The term "alkynyl," as used herein, refers to an aliphatic hydrocarbon group containing at least one carbon-carbon triple bond and having one of its hydrogen atoms replaced with a bond. An alkynyl group may be straight or branched and contain from about 2 to about 15 carbon atoms. In one embodiment, an alkynyl group contains from about 2 to about 12 carbon atoms. In another embodiment, an alkynyl group contains from about 2 to about 6 carbon atoms. Non-limiting examples of alkynyl groups include ethynyl, propynyl, 2-butynyl and 3-methylbutynyl. An alkynyl group may be unsubstituted or substituted by one or more substituents which may be the same or different, each substituent being independently selected from the group consisting of halo, alkenyl, alkynyl, aryl, cycloalkyl, cyano, hydroxy, —O-alkyl, —O-aryl, -alkylene-O-alkyl, alkylthio, —$NH_2$, —NH(alkyl), —N(alkyl)$_2$, —NH(cycloalkyl), —O—C(O)-alkyl, —O—C(O)-aryl, —O—C(O)-cycloalkyl, —C(O)OH and —C(O)O-alkyl. The term "$C_2$-$C_6$ alkynyl" refers to an alkynyl group having from 2 to 6 carbon atoms. Unless otherwise indicated, an alkynyl group is unsubstituted.

The term "alkylene," as used herein, refers to an alkyl group, as defined above, wherein one of the alkyl group's hydrogen atoms has been replaced with a bond. Non-limiting examples of alkylene groups include —CH$_2$—, —CH$_2$CH$_2$—, —CH$_2$CH$_2$CH$_2$—, —CH$_2$CH$_2$CH$_2$CH$_2$—, —CH(CH$_3$)CH$_2$CH$_2$—, —CH(CH$_3$)— and —CH$_2$CH(CH$_3$)CH$_2$—. In one embodiment, an alkylene group has from 1 to about 6 carbon atoms. In another embodiment, an alkylene group is branched. In another embodiment, an alkylene group is linear. In one embodiment, an alkylene group is —CH$_2$—. The term "C$_1$-C$_6$ alkylene" refers to an alkylene group having from 1 to 6 carbon atoms.

The term "aryl," as used herein, refers to an aromatic monocyclic or multicyclic ring system comprising from about 6 to about 14 carbon atoms. In one embodiment, an aryl group contains from about 6 to about 10 carbon atoms. An aryl group can be optionally substituted with one or more "ring system substituents" which may be the same or different, and are as defined herein below. In one embodiment, an aryl group can be optionally fused to a cycloalkyl or cycloalkanoyl group. Non-limiting examples of aryl groups include phenyl and naphthyl. In one embodiment, an aryl group is phenyl. In another embodiment, an aryl group is napthalene. Unless otherwise indicated, an aryl group is unsubstituted.

The term "cycloalkyl," as used herein, refers to a non-aromatic mono- or multicyclic ring system comprising from about 3 to about 10 ring carbon atoms. In one embodiment, a cycloalkyl contains from about 5 to about 10 ring carbon atoms. In another embodiment, a cycloalkyl contains from about 3 to about 7 ring atoms. In another embodiment, a cycloalkyl contains from about 5 to about 6 ring atoms. Non-limiting examples of monocyclic cycloalkyls include cyclopropyl, cyclobutyl, cyclopentyl, cyclohexyl, cycloheptyl and cyclooctyl. Non-limiting examples of multicyclic cycloalkyls include 1-decalinyl, norbornyl and adamantyl. A cycloalkyl group can be optionally substituted with one or more "ring system substituents" which may be the same or different, and are as defined herein below. Unless otherwise indicated, a cycloalkyl group is unsubstituted. In one embodiment, a cycloalkyl group is unsubstituted. The term "3 to 6-membered cycloalkyl" refers to a cycloalkyl group having from 3 to 6 ring carbon atoms. A ring carbon atom of a cycloalkyl group may be functionalized as a carbonyl group. An illustrative example of such a cycloalkyl group (also referred to herein as a "cycloalkanoyl" group) includes, but is not limited to, cyclobutanoyl:

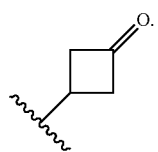 [SMILES: *C1CC(=O)C1]

The term "cycloalkenyl," as used herein, refers to a non-aromatic mono- or multicyclic ring system comprising from about 4 to about 10 ring carbon atoms and containing at least one endocyclic double bond. In one embodiment, a cycloalkenyl contains from about 4 to about 7 ring carbon atoms. In another embodiment, a cycloalkenyl contains 5 or 6 ring atoms. Non-limiting examples of monocyclic cycloalkenyls include cyclopentenyl, cyclohexenyl, cyclohepta-1,3-dienyl, and the like. A cycloalkenyl group can be optionally substituted with one or more "ring system substituents" which may be the same or different, and are as defined herein below. A ring carbon atom of a cycloalkyl group may be functionalized as a carbonyl group. In one embodiment, a cycloalkenyl group is cyclopentenyl. In another embodiment, a cycloalkenyl group is cyclohexenyl. The term "4 to 6-membered cycloalkenyl" refers to a cycloalkenyl group having from 4 to 6 ring carbon atoms. Unless otherwise indicated, a cycloalkenyl group is unsubstituted.

The term "halo," as used herein, means —F, —Cl, —Br or —I.

The term "haloalkyl," as used herein, refers to an alkyl group as defined above, wherein one or more of the alkyl group's hydrogen atoms has been replaced with a halogen. In one embodiment, a haloalkyl group has from 1 to 6 carbon atoms. In another embodiment, a haloalkyl group is substituted with from 1 to 3 F atoms. Non-limiting examples of haloalkyl groups include —CH$_2$F, —CHF$_2$, —CF$_3$, —CH$_2$Cl and —CCl$_3$.

The term "C$_1$-C$_6$ haloalkyl" refers to a haloalkyl group having from 1 to 6 carbon atoms.

The term "hydroxyalkyl," as used herein, refers to an alkyl group as defined above, wherein one or more of the alkyl group's hydrogen atoms has been replaced with an —OH group. In one embodiment, a hydroxyalkyl group has from 1 to 6 carbon atoms. Non-limiting examples of hydroxyalkyl groups include —CH$_2$OH, —CH$_2$CH$_2$OH, —CH$_2$CH$_2$CH$_2$OH and —CH$_2$CH(OH)CH$_3$. The term "C$_1$-C$_6$ hydroxyalkyl" refers to a hydroxyalkyl group having from 1 to 6 carbon atoms.

The term "heteroaryl," as used herein, refers to an aromatic monocyclic or multicyclic ring system comprising about 5 to about 14 ring atoms, wherein from 1 to 4 of the ring atoms is independently O, N or S and the remaining ring atoms are carbon atoms. In one embodiment, a heteroaryl group has 5 to 10 ring atoms. In another embodiment, a heteroaryl group is monocyclic and has 5 or 6 ring atoms. In another embodiment, a heteroaryl group is bicyclic and had 9 or 10 ring atoms. A heteroaryl group can be optionally substituted by one or more "ring system substituents" which may be the same or different, and are as defined herein below. A heteroaryl group is joined via a ring carbon atom, and any nitrogen atom of a heteroaryl can be optionally oxidized to the corresponding N-oxide. The term "heteroaryl" also encompasses a heteroaryl group, as defined above, which is fused to a benzene ring. Non-limiting examples of heteroaryls include pyridyl, pyrazinyl, furanyl, thienyl, pyrimidinyl, pyridone (including N-substituted pyridones), isoxazolyl, isothiazolyl, oxazolyl, oxadiazolyl, thiazolyl, pyrazolyl, furazanyl, pyrrolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, benzimidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like, and all isomeric forms thereof. The term "heteroaryl" also refers to partially saturated heteroaryl moieties such as, for example, tetrahydroisoquinolyl, tetrahydroquinolyl and the like. In one embodiment, a heteroaryl group is a 5-membered heteroaryl. In another embodiment, a heteroaryl group is a 6-membered heteroaryl. In another embodiment, a "9- or 10-membered bicyclic heteroaryl" group comprises a 5- to 6-membered heterocycloalkyl group fused to a benzene ring, such as:

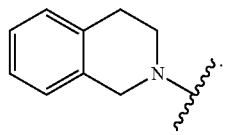 [SMILES: *N1CCc2ccccc2C1]

In still another embodiment, a "9- or 10-membered bicyclic heteroaryl" group comprises a 5- to 6-membered heteroaryl group fused to a cycloalkyl ring or a heterocycloalkyl ring, such as:

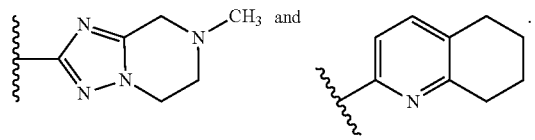 [SMILES: *c1nc2n(n1)CCN(C)C2 ; *c1ccc2c(n1)CCCC2]

Unless otherwise indicated, a heteroaryl group is unsubstituted.

The term "heteroarylene," as used herein, refers to a bivalent group derived from an heteroaryl group, as defined above, by removal of a hydrogen atom from a ring carbon or ring heteroatom of a heteroaryl group. A heteroarylene group can be derived from a monocyclic or multicyclic ring system comprising about 5 to about 14 ring atoms, wherein from 1 to 4 of the ring atoms are each independently O, N or S and the remaining ring atoms are carbon atoms. A heteroarylene group can be optionally substituted by one or more "ring system substituents" which may be the same or different, and are as defined herein below. Unless otherwise indicated, a heteroarylene group is unsubstituted. A heteroarylene group is joined via a ring carbon atom or by a nitrogen atom with an open valence, and any nitrogen atom of a heteroarylene can be optionally oxidized to the corresponding N-oxide. The term "heteroarylene" also encompasses a heteroarylene group, as defined above, which is fused to a benzene ring. Non-limiting examples of heteroarylenes include pyridylene, pyrazinylene, furanylene, thienylene, pyrimidinylene, pyridonylene (including those derived from N-substituted pyridonyls), isoxazolylene, isothiazolylene, oxazolylene, oxadiazolylene, thiazolylene, pyrazolylene, thiophenylene, furazanylene, pyrrolylene, triazolylene, 1,2,4-thiadiazolylene, pyrazinylene, pyridazinylene, quinoxalinylene, phthalazinylene, oxindolylene, imidazo[1,2-a]pyridinylene, imidazo[2,1-b]thiazolylene, benzofurazanylene, indolylene, azaindolylene, benzimidazolylene, benzothienylene, quinolinylene, imidazolylene, benzimidazolylene, thienopyridylene, quinazolinylene, thienopyrimidylene, pyrrolopyridylene, imidazopyridylene, isoquinolinylene, benzoazaindolylene, 1,2,4-triazinylene, benzothiazolylene and the like, and all isomeric forms thereof. The term "heteroarylene" also refers to partially saturated heteroarylene moieties such as, for example, tetrahydroisoquinolylene, tetrahydroquinolylene, and the like. A heteroarylene group is divalent and unless specified otherwise, either available bond on a heteroarylene ring can connect to either group flanking the heteroarylene group. For example, the group "A-heteroarylene-B," wherein the heteroarylene group is:

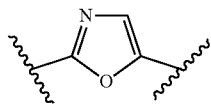 [SMILES: *c1cnc(*)o1]

is understood to represent both:

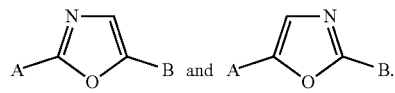

In one embodiment, a heteroarylene group is a monocyclic heteroarylene group or a bicyclic heteroarylene group. In another embodiment, a heteroarylene group is a monocyclic heteroarylene group. In another embodiment, a heteroarylene group is a bicyclic heteroarylene group. In still another embodiment, a heteroarylene group has from about 5 to about 10 ring atoms. In another embodiment, a heteroarylene group is monocyclic and has 5 or 6 ring atoms. In another embodiment, a heteroarylene group is bicyclic and has 9 or 10 ring atoms. In another embodiment, a heteroarylene group is a 5-membered monocyclic heteroarylene. In another embodiment, a heteroarylene group is a 6-membered monocyclic heteroarylene. In another embodiment, a bicyclic heteroarylene group comprises a 5 or 6-membered monocyclic heteroarylene group fused to a benzene ring. In still another embodiment, a heteroaryl group comprises a 5- to 6-membered monocyclic heteroarylene group fused to a cycloalkyl ring or a heterocycloalkyl ring.

The term "heterocycloalkyl," as used herein, refers to a non-aromatic saturated monocyclic or multicyclic ring system comprising 3 to about 11 ring atoms, wherein from 1 to 4 of the ring atoms are independently O, S, N or Si, and the remainder of the ring atoms are carbon atoms. A heterocycloalkyl group can be joined via a ring carbon, ring silicon atom or ring nitrogen atom. In one embodiment, a heterocycloalkyl group is monocyclic. In one embodiment, a heterocycloalkyl group is monocyclic and has from about 3 to about 7 ring atoms ("3 to 7-membered bicyclic heterocycloalkyl"). In another embodiment, a heterocycloalkyl group is monocyclic has from about 4 to about 7 ring atoms ("4 to 7-membered bicyclic heterocycloalkyl"). In still another embodiment, a heterocycloalkyl group is monocyclic and has 5 or 6 ring atoms ("5 or 6-membered monocyclic heterocycloalkyl"). In one embodiment, a heterocycloalkyl group is bicyclic. In another embodiment, a heterocycloalkyl group is bicyclic and has from about 6 to about 10 ring atoms ("6 to 10-membered bicyclic heterocycloalkyl"). There are no adjacent oxygen and/or sulfur atoms present in the ring system. Any —NH group in a heterocycloalkyl ring may exist protected such as, for example, as an —N(BOC), —N(CBz), —N(Tos) group and the like; such protected heterocycloalkyl groups are considered part of this invention. A heterocycloalkyl group can be optionally substituted by one or more "ring system substituents" which may be the same or different, and are as defined herein below. Unless otherwise indicated, a heterocycloalkyl group is unsubstituted. The nitrogen or sulfur atom of the heterocycloalkyl can be optionally oxidized to the corresponding N-oxide, S-oxide or S,S-dioxide. Non-limiting examples of monocyclic heterocycloalkyl rings include oxetanyl, piperidyl, pyrrolidinyl, piperazinyl, morpholinyl, thiomorpholinyl, thiazolidinyl, 1,4-dioxanyl, tetrahydrofuranyl, tetrahydrothiophenyl, delta-lactam, delta-lactone, silacyclopentane, silapyrrolidine and the like, and all isomers thereof. Non-limiting illustrative examples of a silyl-containing heterocycloalkyl group include:

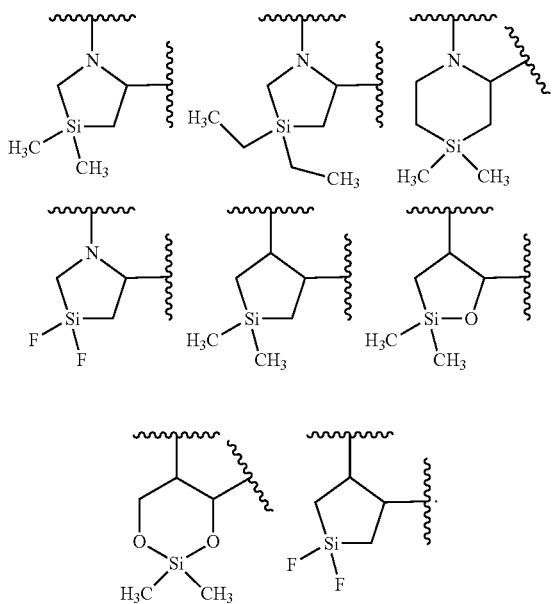

A ring carbon atom of a heterocycloalkyl group may be functionalized as a carbonyl group. Illustrative examples of such a heterocycloalkyl group include, but are not limited to:

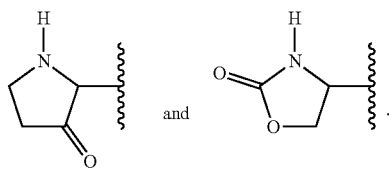 [SMILES: *C1NCCC1=O ; *C1COC(=O)N1]

A ring sulfur atom of a heterocycloalkyl group may also be functionalized as a sulfonyl group. An example of such a heterocycloalkyl group is:

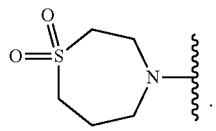 [SMILES: *N1CCCS(=O)(=O)CC1]

In one embodiment, a heterocycloalkyl group is a 5-membered monocyclic heterocycloalkyl. In another embodiment, a heterocycloalkyl group is a 6-membered monocyclic heterocycloalkyl.

A multicyclic heterocycloalkyl group may have rings that are fused, rings that are joined in a spirocyclic manner, and rings that are bridged. In one embodiment, a heterocycloalkyl group can be a bicyclic spirocyclic heteroaryl group having from 7 to 9 ring atoms. Illustrative examples of such a bicyclic heteroycloalkyl group include:

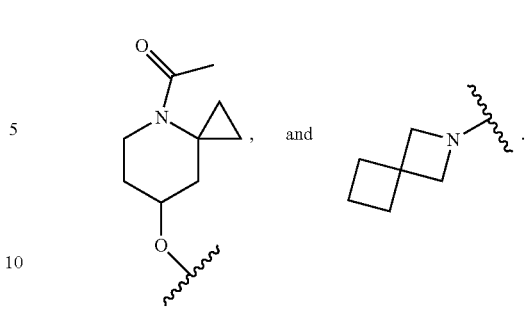

In another embodiment, a heterocycloalkyl group can be a bicyclic fused heterocycloalkyl group having from 6 to 10 ring atoms. Illustrative examples of such a fused bicyclic heteroycloalkyl group include:

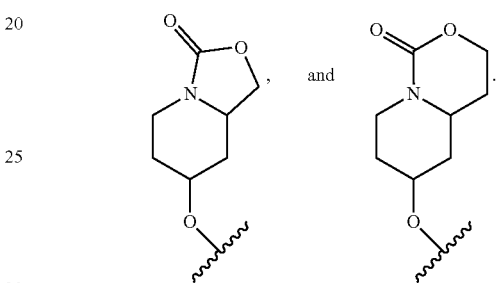

In another embodiment, a heterocycloalkyl group can be a bridged bridged heterocycloalkyl group having from 6 to 10 ring atoms. Illustrative examples of such a bridged bicyclic heteroycloalkyl group include:

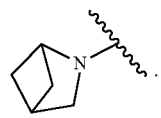 [SMILES: *N1CC2CC1C2]

The term "heterocycloalkenyl," as used herein, refers to a heterocycloalkyl group, as defined above, wherein the heterocycloalkyl group contains from 4 to 10 ring atoms, and at least one endocyclic carbon-carbon or carbon-nitrogen double bond. A heterocycloalkenyl group can be joined via a ring carbon or ring nitrogen atom. In one embodiment, a heterocycloalkenyl group has from 4 to 6 ring atoms. In another embodiment, a heterocycloalkenyl group is monocyclic and has 5 or 6 ring atoms. In another embodiment, a heterocycloalkenyl group is bicyclic. A heterocycloalkenyl group can optionally substituted by one or more ring system substituents, wherein "ring system substituent" is as defined above. Unless otherwise indicated, a heterocycloalkenyl group is unsubstituted. The nitrogen or sulfur atom of the heterocycloalkenyl can be optionally oxidized to the corresponding N-oxide, S-oxide or S,S-dioxide. A ring carbon atom of a heterocycloalkenyl group may be functionalized as a carbonyl group. Non-limiting examples of heterocycloalkenyl groups include 1,2,3,4-tetrahydropyridinyl, 1,2-dihydropyridinyl, 1,4-dihydropyridinyl, 1,2,3,6-tetrahydropyridinyl, 1,4,5,6-tetrahydropyrimidinyl, 2-pyrrolinyl, 3-pyrrolinyl, 2-imidazolinyl, 2-pyrazolinyl, dihydroimidazolyl, dihydrooxazolyl, dihydrooxadiazolyl, dihydrothiazolyl, 3,4-dihydro-2H-pyranyl, dihydrofuranyl, fluoro-substituted dihydrofuranyl, 7-oxabicyclo[2.2.1]heptenyl, dihydrothiophenyl, dihydrothiopyranyl, and the like and the like. In one embodiment, a heterocycloalkenyl group is a 5-membered heterocycloalkenyl. In another embodiment, a heterocycloalkenyl group is a 6-membered heterocycloalkenyl. The term "4 to 6-membered heterocycloalkenyl" refers to a heterocycloalkenyl group having from 4 to 6 ring atoms.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds. By "stable compound" or "stable structure" is meant a compound that is sufficiently robust to survive isolation to a useful degree of purity from a reaction mixture, and formulation into an efficacious therapeutic agent.

The term "in substantially purified form," as used herein, refers to the physical state of a compound after the compound is isolated from a synthetic process (e.g., from a reaction mixture), a natural source, or a combination thereof. The term "in substantially purified form," also refers to the physical state of a compound after the compound is obtained from a purification process or processes described herein or well-known to the skilled artisan (e.g., chromatography, recrystallization and the like), in sufficient purity to be characterizable by standard analytical techniques described herein or well-known to the skilled artisan.

It should also be noted that any carbon as well as heteroatom with unsatisfied valences in the text, schemes, examples and tables herein is assumed to have the sufficient number of hydrogen atom(s) to satisfy the valences.

When a functional group in a compound is termed "protected", this means that the group is in modified form to preclude undesired side reactions at the protected site when the compound is subjected to a reaction. Suitable protecting groups will be recognized by those with ordinary skill in the art as well as by reference to standard textbooks such as, for example, T. W. Greene et al, *Protective Groups in Organic Synthesis* (1991), Wiley, New York.

Examples of "ring system substituents" include, but are not limited to, alkyl, alkenyl, alkynyl, aryl, heteroaryl, -alkylene-aryl, -arylene-alkyl, -alkylene-heteroaryl, -alkenylene-heteroaryl, -alkynylene-heteroaryl, —OH, hydroxyalkyl, haloalkyl, —O-alkyl, —O-haloalkyl, -alkylene-O-alkyl, —O-aryl, —O-alkylene-aryl, acyl, —C(O)-aryl, halo, —NO$_2$, —CN, —SF$_5$, —C(O)OH, —C(O)O-alkyl, —C(O)O-aryl, —C(O)O-alkylene-aryl, —S(O)-alkyl, —S(O)$_2$-alkyl, —S(O)-aryl, —S(O)$_2$-aryl, —S(O)-heteroaryl, —S(O)z-heteroaryl, —S-alkyl, —S-aryl, —S-heteroaryl, —S-alkylene-aryl, —S-alkyleneheteroaryl, —S(O)$_2$-alkylene-aryl, —S(O)$_2$-alkylene-heteroaryl, —Si (alkyl)$_2$, —Si(aryl)$_2$, Si(heteroaryl)$_2$-Si(alkyl)(aryl), —Si (alkyl)(cycloalkyl), —Si(alkyl)(heteroaryl), cycloalkyl, heterocycloalkyl, —O—C(O)-alkyl, —O—C(O)-aryl, —O—C (O)-cycloalkyl, —C(=N—CN)—NH$_2$, —C(=NH)—NH$_2$, —C(=NH)—NH(alkyl), —N(Y$^1$)(Y$^2$), -alkylene-N(Y$^1$) (Y$^2$), —C(O)N(Y$^1$)(Y$^2$), and —S(O)$_2$N(Y$^1$)(Y$^2$), wherein Y$^1$ and Y$^2$ can be the same or different and are independently selected from the group consisting of hydrogen, alkyl, aryl, cycloalkyl, and -alkylene-aryl. "Ring system substituent" may also mean a single moiety which simultaneously replaces two available hydrogens on two adjacent carbon atoms (one H on each carbon) on a ring system. Examples of such moiety are methylenedioxy, ethylenedioxy, —C(CH$_3$)$_2$— and the like which form moieties such as, for example:

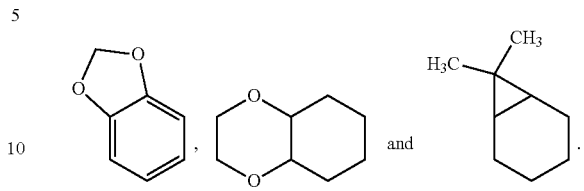

When any substituent or variable (e.g., R$^1$, m, etc.) occurs more than one time in any constituent or in Formula (I), its definition on each occurrence is independent of its definition at every other occurrence, unless otherwise indicated.

As used herein, the term "composition" is intended to encompass a product comprising the specified ingredients in the specified amounts, as well as any product which results from combination of the specified ingredients in the specified amounts.

Prodrugs and solvates of the compounds of the invention are also contemplated herein. A discussion of prodrugs is provided in T. Higuchi and V. Stella, *Pro-drugs as Novel Delivery Systems* (1987) 14 of the A.C.S. Symposium Series, and in *Bioreversible Carriers in Drug Design*, (1987) Edward B. Roche, ed., American Pharmaceutical Association and Pergamon Press. The term "prodrug" means a compound (e.g., a drug precursor) that is transformed in vivo to provide a Fused [7,5] Bicyclic Pyrazole Derivative or a pharmaceutically acceptable salt or solvate of the compound. The transformation may occur by various mechanisms (e.g., by metabolic or chemical processes), such as, for example, through hydrolysis in blood.

For example, if a Fused [7,5] Bicyclic Pyrazole Derivative or a pharmaceutically acceptable salt, hydrate or solvate of the compound contains a carboxylic acid functional group, a prodrug can comprise an ester formed by the replacement of the hydrogen atom of the acid group with a group such as, for example, (C$_1$-C$_8$)alkyl, (C$_2$-C$_{12}$)alkanoyloxymethyl, 1-(alkanoyloxy)ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 6 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino)ethyl having from 4 to 10 carbon atoms, 3-phthalidyl, 4-crotonolactonyl, gamma-butyrolacton-4-yl, di-N,N—(C$_1$-C$_2$)alkylamino(C$_2$-C$_3$)alkyl (such as β-dimethylaminoethyl), carbamoyl-(C$_1$-C$_2$)alkyl, N,N-di (C$_1$-C$_2$) alkylcarbamoyl-(C$_1$-C$_2$)alkyl and piperidino-, pyrrolidino- or morpholino(C$_2$-C$_3$)alkyl, and the like.

Similarly, if a Fused [7,5] Bicyclic Pyrazole Derivative contains an alcohol functional group, a prodrug can be formed by the replacement of the hydrogen atom of the alcohol group with a group such as, for example, (C$_1$-C$_6$) alkanoyloxymethyl, 1-((C$_1$-C$_6$)alkanoyloxy)ethyl, 1-methyl-1-((C$_1$-C$_6$)alkanoyloxy)ethyl, (C$_1$-C$_6$)alkoxycarbonyloxymethyl, N—(C$_1$-C$_6$)alkoxycarbonylaminomethyl, succinoyl, (C$_1$-C$_6$)alkanoyl, α-amino(C$_1$-C$_4$)alkyl, α-amino (C$_1$-C$_4$)alkylene-aryl, arylacyl and α-aminoacyl, or α-aminoacyl-α-aminoacyl, where each α-aminoacyl group is independently selected from the naturally occurring L-amino acids, —P(O)(OH)$_2$, —P(O)(O(C$_1$-C$_6$)alkyl)$_2$ or glycosyl (the radical resulting from the removal of a hydroxyl group of the hemiacetal form of a carbohydrate), and the like.

If a Fused [7,5] Bicyclic Pyrazole Derivative incorporates an amine functional group, a prodrug can be formed by the replacement of a hydrogen atom in the amine group with a group such as, for example, R-carbonyl-, RO-carbonyl-, NRR'-carbonyl- wherein R and R' are each independently ($C_1$-$C_{10}$)alkyl, ($C_3$-$C_7$) cycloalkyl, benzyl, a natural α-aminoacyl, —C(OH)C(O)O$Y^1$ wherein $Y^1$ is H, ($C_1$-$C_6$)alkyl or benzyl, —C(O$Y^2$)$Y^3$ wherein $Y^2$ is ($C_1$-$C_4$) alkyl and $Y^3$ is ($C_1$-$C_6$)alkyl; carboxy ($C_1$-$C_6$)alkyl; amino($C_1$-$C_4$)alkyl or mono-N— or di-N,N—($C_1$-$C_6$)alkylaminoalkyl; —C($Y^4$)$Y^5$ wherein $Y^4$ is H or methyl and $Y^5$ is mono-N— or di-N,N—($C_1$-$C_6$)alkylamino morpholino; piperidin-1-yl or pyrrolidin-1-yl, and the like.

Pharmaceutically acceptable esters of the present compounds include the following groups: (1) carboxylic acid esters obtained by esterification of the hydroxy group of a hydroxyl compound, in which the non-carbonyl moiety of the carboxylic acid portion of the ester grouping is selected from straight or branched chain alkyl (e.g., methyl, ethyl, n-propyl, isopropyl, t-butyl, sec-butyl or n-butyl), alkoxyalkyl (e.g., methoxymethyl), aralkyl (e.g., benzyl), aryloxyalkyl (for example, phenoxymethyl), aryl (e.g., phenyl optionally substituted with, for example, halogen, $C_{1-4}$alkyl, —O—($C_{1-4}$alkyl) or amino); (2) sulfonate esters, such as alkyl- or aralkylsulfonyl (for example, methanesulfonyl); (3) amino acid esters (e.g., L-valyl or L-isoleucyl); (4) phosphonate esters and (5) mono-, di- or triphosphate esters. The phosphate esters may be further esterified by, for example, a $C_{1-20}$ alcohol or reactive derivative thereof, or by a 2,3-di ($C_{6-24}$)acyl glycerol.

One or more compounds of the invention may exist in unsolvated as well as solvated forms with pharmaceutically acceptable solvents such as water, ethanol, and the like, and it is intended that the invention embrace both solvated and unsolvated forms. "Solvate" means a physical association of a compound of this invention with one or more solvent molecules. This physical association involves varying degrees of ionic and covalent bonding, including hydrogen bonding. In certain instances the solvate will be capable of isolation, for example when one or more solvent molecules are incorporated in the crystal lattice of the crystalline solid. "Solvate" encompasses both solution-phase and isolatable solvates. Non-limiting examples of solvates include ethanolates, methanolates, and the like. A "hydrate" is a solvate wherein the solvent molecule is water.

One or more compounds of the invention may optionally be converted to a solvate. Preparation of solvates is generally known. Thus, for example, M. Caira et al, *J. Pharmaceutical Sci.*, 93(3), 601-611 (2004) describe the preparation of the solvates of the antifungal fluconazole in ethyl acetate as well as from water. Similar preparations of solvates, hemisolvate, hydrates and the like are described by E. C. van Tonder et al, *AAPS PharmSciTechours.*, 5(1), article 12 (2004); and A. L. Bingham et al, *Chem. Commun.*, 603-604 (2001). A typical, non-limiting, process involves dissolving the inventive compound in desired amounts of the desired solvent (organic or water or mixtures thereof) at a higher than room temperature, and cooling the solution at a rate sufficient to form crystals which are then isolated by standard methods. Analytical techniques such as, for example IR spectroscopy, show the presence of the solvent (or water) in the crystals as a solvate (or hydrate).

The Fused [7,5] Bicyclic Pyrazole Derivatives can form salts which are also within the scope of this invention. The term "salt(s)", as employed herein, denotes acidic salts formed with inorganic and/or organic acids, as well as basic salts formed with inorganic and/or organic bases. In addition, when a Fused [7,5] Bicyclic Pyrazole Derivative contains both a basic moiety, such as, but not limited to a pyridine or imidazole, and an acidic moiety, such as, but not limited to a carboxylic acid, zwitterions ("inner salts") may be formed and are included within the term "salt(s)" as used herein. In one embodiment, the salt is a pharmaceutically acceptable (i.e., non-toxic, physiologically acceptable) salt. In another embodiment, the salt is other than a pharmaceutically acceptable salt. Salts of the Compounds of Formula (I) may be formed, for example, by reacting a Fused [7,5] Bicyclic Pyrazole Derivative with an amount of acid or base, such as an equivalent amount, in a medium such as one in which the salt precipitates or in an aqueous medium followed by lyophilization.

Exemplary acid addition salts include acetates, ascorbates, benzoates, benzenesulfonates, bisulfates, borates, butyrates, citrates, camphorates, camphorsulfonates, fumarates, hydrochlorides, hydrobromides, hydroiodides, lactates, maleates, methanesulfonates, naphthalenesulfonates, nitrates, oxalates, phosphates, propionates, salicylates, succinates, sulfates, tartarates, thiocyanates, toluenesulfonates (also known as tosylates), and the like. Additionally, acids which are generally considered suitable for the formation of pharmaceutically useful salts from basic pharmaceutical compounds are discussed, for example, by P. Stahl et al, Camille G. (eds.) Handbook of Pharmaceutical Salts. Properties, Selection and *Use*. (2002) Zurich: Wiley-V C H; S. Berge et al, Journal of Pharmaceutical Sciences (1977) 66(1) 1-19; P. Gould, International J. of Pharmaceutics (1986) 33 201-217; Anderson et al, The Practice of Medicinal Chemistry (1996), Academic Press, New York; and in *The Orange Book* (Food & Drug Administration, Washington, D.C. on their website). These disclosures are incorporated herein by reference thereto.

Exemplary basic salts include ammonium salts, alkali metal salts such as sodium, lithium, and potassium salts, alkaline earth metal salts such as calcium and magnesium salts, salts with organic bases (for example, organic amines) such as dicyclohexylamine, t-butyl amine, choline, and salts with amino acids such as arginine, lysine and the like. Basic nitrogen-containing groups may be quarternized with agents such as lower alkyl halides (e.g., methyl, ethyl, and butyl chlorides, bromides and iodides), dialkyl sulfates (e.g., dimethyl, diethyl, and dibutyl sulfates), long chain halides (e.g., decyl, lauryl, and stearyl chlorides, bromides and iodides), aralkyl halides (e.g., benzyl and phenethyl bromides), and others.

All such acid salts and base salts are intended to be pharmaceutically acceptable salts within the scope of the invention and all acid and base salts are considered equivalent to the free forms of the corresponding compounds for purposes of the invention.

Diastereomeric mixtures can be separated into their individual diastereomers on the basis of their physical chemical differences by methods well-known to those skilled in the art, such as, for example, by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereomers to the corresponding pure enantiomers. Sterochemically pure compounds may also be prepared by using chiral starting materials or by employing salt resolution techniques. Also, some of the Fused [7,5] Bicyclic Pyrazole Derivatives may be atropisomers (e.g., substituted biaryls), and are considered as part of this invention. Enantiomers can also be directly separated using chiral chromatographic techniques.

It is also possible that the Fused [7,5] Bicyclic Pyrazole Derivatives may exist in different tautomeric forms, and all such forms are embraced within the scope of the invention. For example, all keto-enol and imine-enamine forms of the compounds are included in the invention.

All stereoisomers (for example, geometric isomers, optical isomers and the like) of the present compounds (including those of the salts, solvates, hydrates, esters and prodrugs of the compounds as well as the salts, solvates and esters of the prodrugs), such as those which may exist due to asymmetric carbons on various substituents, including enantiomeric forms (which may exist even in the absence of asymmetric carbons), rotameric forms, atropisomers, and diastereomeric forms, are contemplated within the scope of this invention. If a Fused [7,5] Bicyclic Pyrazole Derivative incorporates a double bond or a fused ring, both the cis- and trans-forms, as well as mixtures, are embraced within the scope of the invention.

Individual stereoisomers of the compounds of the invention may, for example, be substantially free of other isomers, or may be admixed, for example, as racemates or with all other, or other selected, stereoisomers. The chiral centers of the present invention can have the S or R configuration as defined by the *IUPAC* 1974 Recommendations. The use of the terms "salt", "solvate", "ester", "prodrug" and the like, is intended to apply equally to the salt, solvate, ester and prodrug of enantiomers, stereoisomers, rotamers, tautomers, positional isomers, racemates or prodrugs of the inventive compounds.

In the Compounds of Formula (I), the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of generic Formula I. For example, different isotopic forms of hydrogen (H) include protium ($^1$H), and deuterium ($^2$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched Compounds of Formula (I) can be prepared without undue experimentation by conventional techniques well known to those skilled in the art or by processes analogous to those described in the Schemes and Examples herein using appropriate isotopically-enriched reagents and/or intermediates. In one embodiment, a Compound of Formula (I) has one or more of its hydrogen atoms replaced with deuterium.

Polymorphic forms of the Fused [7,5] Bicyclic Pyrazole Derivatives, and of the salts, solvates, hydrates, esters and prodrugs of the Fused [7,5] Bicyclic Pyrazole Derivatives, are intended to be included in the present invention.

The following abbreviations are used below and have the following meanings: ATCC is American Type Culture Collection; boc is t-butyloxycarbonyl; DMF is N,N-dimethylformamide; DMSO is dimethylsulfoxide; EDTA is ethylenediaminetetraacetic acid; EtOAc is ethyl acetate; HATU is 1-[Bis(dimethylamino)methylene]-1H-1,2,3-triazolo[4,5-b] pyridinium 3-oxid hexafluorophosphate; HEPES is 2-[4-(2-hydroxyethyl)piperazin-1-yl]ethanesulfonic acid; HPLC is high performance liquid chromatography; Me is methyl; MS is mass spectrometry; NMR is nuclear magnetic resonance; t-butyl is tertiary butyl; TFA is trifluoroacetic acid; THF is tetrahydrofuran; and TLC is thin-layer chromatography.

The Compounds of Formula (I)

The present invention provides Fused [7,5] Bicyclic Pyrazole Derivatives of Formula (I):

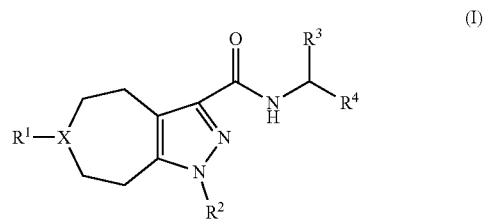

and pharmaceutically acceptable salts thereof, wherein X, $R^1$, $R^2$, $R^3$, and $R^4$ are as defined above for the Compounds of Formula (I).

In one embodiment, X is N.

In another embodiment, X is CH.

In another embodiment, X is C(OH).

In still another embodiment, X is C(CH$_3$).

In one embodiment, $R^1$ is selected from

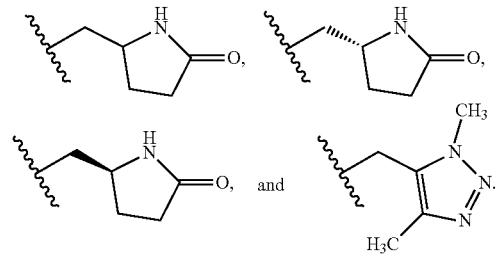

In another embodiment, X is N, and $R^1$ is selected from

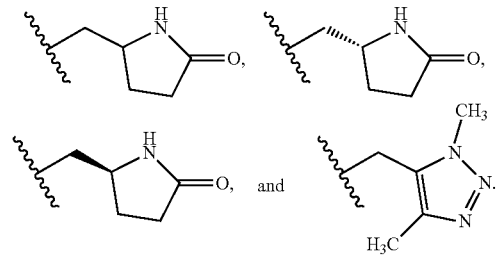

In another embodiment, X is CH, and $R^1$ is selected from

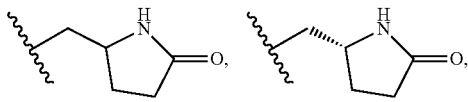

-continued

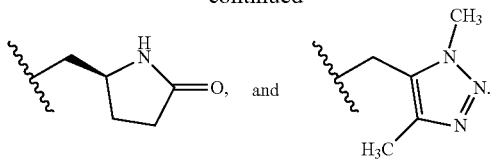

In one embodiment, $R^2$ is selected from H, methyl, ethyl, isopropyl, —CHF$_2$, —CH$_2$CH(OH)CH(CH$_3$)$_2$, —CH$_2$C(OH)(CH$_3$)$_2$, —CH$_2$CH$_2$NHC(O)CH(CH$_3$)$_2$, —CH$_2$CH$_2$NHC(O)-cyclobutanyl, —CH$_2$CH$_2$N(CH$_3$)C(O)-cyclobutanyl, and —CH$_2$CH$_2$N(CH$_3$)C(O)-cyclopropanyl, wherein said cyclopentanyl group, said cyclobutanyl group, and said cyclopropanyl group can be optionally substituted with one or more of the following groups, which can be the same or different: F, Cl, methyl, ethyl, isopropyl, isobutyl, t-butyl, methoxy, ethoxy, —OH, —CH$_2$OH, —CH$_2$F, and phenyl.

In another embodiment, $R^2$ is methyl

In one embodiment, $R^3$ is H.

In another embodiment, $R^3$ is methyl.

In one embodiment, $R^4$ is phenyl, which is substituted with one or more of the following groups, which can be the same or different: F, Cl and CN.

In another embodiment, $R^4$ is:

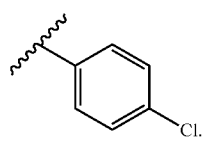 [SMILES: *c1ccc(Cl)cc1]

In one embodiment, $R^5$ is H.

In another embodiment, $R^5$ is OH.

In another embodiment, $R^5$ is methyl.

It is understood that the present invention includes any combination of two or more of the above embodiments.

It is understood that the present invention encompasses compounds of formula (I) in isolated and purified form.

Other embodiments of the present invention include the following:
(a) A pharmaceutical composition comprising an effective amount of a Compound of Formula (I) or a pharmaceutically acceptable salt thereof, and a pharmaceutically acceptable carrier.
(b) The pharmaceutical composition of (a), further comprising a second therapeutic agent selected from the group consisting of anti-herpes agents and immunomodulators.
(c) The pharmaceutical composition of (b), wherein the anti-herpes agent is selected from the group consisting of herpesvirus polymerase inhibitors, and CMV terminase inhibitors.
(d) A pharmaceutical combination that is (i) a Compound of Formula (I), and (ii) a second therapeutic agent selected from the group consisting of anti-herpes agents and immunomodulators; wherein the Compound of Formula (I), and the second therapeutic agent are each employed in an amount that renders the combination effective for inhibiting herpesvirus replication, or for treating herpesvirus infection and/or reducing the likelihood or severity of symptoms of herpesvirus infection.
(e) The combination of (d), wherein the anti-herpes agent is selected from the group consisting of herpesvirus polymerase inhibitors, and CMV terminase inhibitors.
(f) A method of inhibiting herpesvirus replication in a subject in need thereof which comprises administering to the subject an effective amount of a Compound of Formula (I).
(g) A method of treating herpesvirus infection and/or reducing the likelihood or severity of symptoms of herpesvirus infection in a subject in need thereof which comprises administering to the subject an effective amount of a Compound of Formula (I).
(h) The method of (g), wherein the Compound of Formula (I) is administered in combination with an effective amount of at least one second therapeutic agent selected from the group consisting of anti-herpes agents and immunomodulators.
(i) The method of (h), wherein the anti-herpes agent is selected from the group consisting of herpesvirus polymerase inhibitors, and CMV terminase inhibitors.
(j) A method of inhibiting herpesvirus replication in a subject in need thereof which comprises administering to the subject the pharmaceutical composition of (a), (b) or (c) or the combination of (d) or (e).
(k) A method of treating herpesvirus infection and/or reducing the likelihood or severity of symptoms of herpesvirus infection in a subject in need thereof which comprises administering to the subject the pharmaceutical composition of (a), (b) or (c) or the combination of (d) or (e).

The present invention also includes a compound of the present invention for use (i) in, (ii) as a medicament for, or (iii) in the preparation of a medicament for: (a) medicine; (b) inhibiting herpesvirus replication or (c) treating herpesvirus infection and/or reducing the likelihood or severity of symptoms of herpesvirus infection. In these uses, the compounds of the present invention can optionally be employed in combination with one or more second therapeutic agents selected from anti-herpes agents, anti-infective agents, and immunomodulators.

Additional embodiments of the invention include the pharmaceutical compositions, combinations and methods set forth in (a)-(k) above and the uses set forth in the preceding paragraph, wherein the compound of the present invention employed therein is a compound of one of the embodiments, aspects, classes, sub-classes, or features of the compounds described above. In all of these embodiments, the compound may optionally be used in the form of a pharmaceutically acceptable salt or hydrate as appropriate.

It is further to be understood that the embodiments of compositions and methods provided as (a) through (k) above are understood to include all embodiments of the compounds, including such embodiments as result from combinations of embodiments.

Non-limiting examples of the Compounds of Formula (I) include compounds 1-3, as set forth in the Examples below, and pharmaceutically acceptable salts thereof.

Methods for Making the Compounds of Formula (I)

The Compounds of Formula (I) may be prepared from known or readily prepared starting materials, following methods known to one skilled in the art of organic synthesis. Methods useful for making the Compounds of Formula (I) are set forth in the Examples below Alternative synthetic pathways and analogous structures will be apparent to those skilled in the art of organic synthesis.

One skilled in the art of organic synthesis will recognize that the synthesis of multicyclic heterocycle cores contained in Compounds of Formula (I) may require protection of certain functional groups (i.e., derivatization for the purpose of chemical compatibility with a particular reaction condition). Suitable protecting groups for the various functional groups of these Compounds and methods for their installation and removal are well known in the art of organic chemistry. A summary of many of these methods can be found in Greene et al., Protective Groups in Organic Synthesis, Wiley-Interscience, New York, (1999).

One skilled in the art of organic synthesis will also recognize that one route for the synthesis of the multicyclic heterocycle cores of the Compounds of Formula (I) may be more desirable depending on the choice of appendage substituents.

Additionally, one skilled in the art will recognize that in some cases the order of reactions may differ from that presented herein to avoid functional group incompatibilities and thus adjust the synthetic route accordingly.

The preparation of multicyclic intermediates useful for making the multicyclic heterocycle cores of the Compounds of Formula (I) have been described in the literature and in compendia such as "Comprehensive Heterocyclic Chemistry" editions I, II and III, published by Elsevier and edited by A. R. Katritzky & R. J K Taylor. Manipulation of the required substitution patterns have also been described in the available chemical literature as summarized in compendia such as "Comprehensive Organic Chemistry" published by Elsevier and edited by D H R. Barton and W. D. Ollis; "Comprehensive Organic Functional Group Transformations" edited by edited by A. R. Katritzky & R. J K Taylor and "Comprehensive Organic Transformation" published by Wiley-C V H and edited by R. C. Larock.

The starting materials used and the intermediates prepared using the methods set forth in the Examples below may be isolated and purified if desired using conventional techniques, including but not limited to filtration, distillation, crystallization, chromatography and alike. Such materials can be characterized using conventional means, including physical constants and spectral data.

One skilled in the art will be aware of standard formulation techniques as set forth in the open literature as well as in textbooks such as Zheng, "Formulation and Analytical Development for Low-dose Oral Drug Products," Wiley, 2009, ISBN.

EXAMPLES

General Methods

Solvents, reagents, and intermediates that are commercially available were used as received. Reagents and intermediates that are not commercially available were prepared in the manner as described below. $^1$H NMR spectra are reported as ppm downfield from Me4Si with number of protons, multiplicities, and coupling constants in Hertz indicated parenthetically. Where LC/MS data are presented, the observed parent ion is given. Flash column chromatography was performed using pre-packed normal phase silica or bulk silica, typically using a gradient elution of hexanes or petroleum ether and ethyl acetate, from 100% hexanes/petroleum ether to 100% ethyl acetate. In cases where diastereomers or enantiomers are separated, diastereomeric and enantiomeric excess (% de and % ee, respectively) typically exceeds 95%. In cases where absolute stereochemistry is not shown, the tags "chiral" and "single isomer" are applied.

Example 1

Preparation of Int-1

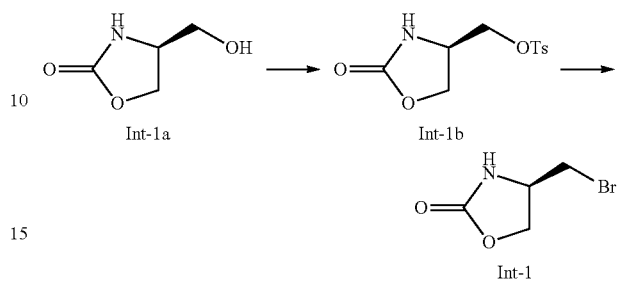

Step A—Synthesis of Int-1b

To a mixture of Int-1a (commercially available, 4.24 g, 34.7 mmol) and triethylamine (229.0 g, 2258 mmol) in dichloromethane (2000 mL) was added 4-methylbenzene-1-sulfonyl chloride (397.0 g, 2085 mmol), and the resulting reaction was allowed to stir at room temperature for 16 hours. The reaction was quenched with saturated aqueous NH$_4$Cl (1000 mL), and extracted with dichloromethane. The organic extract was washed with brine, dried over Na$_2$SO$_4$, filtered, and concentrated in vacuo. The residue obtained was purified using silica gel chromatography eluting with 30-60% EtOAc/petroleum ether to provide Int-1b. MS: m/z 272.1=[M+H].

Step B—Synthesis of Int-1

A mixture of Int-1b (40.0 g, 134 mmol), lithium bromide (58.0 g, 668 mmol), and acetone (800 mL) was stirred for 16 hours at 80° C. The reaction mixture was then concentrated in vacuo, and the resulting residue was diluted with water (500 mL). The resulting solution was extracted with ethyl acetate, and the organic extract was washed sequentially with saturated aqueous sodium thiosulfate (2×500 mL) and water (1000 mL), then dried over Na$_2$SO$_4$, filtered, and concentrated in vacuo to provide Int-1 which was used without further purification.

Example 2

Preparation of Int-2

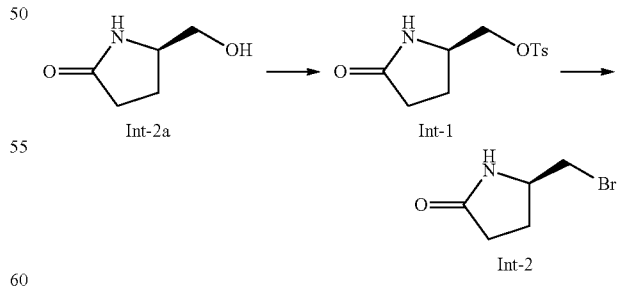

Step A—Synthesis of Int-2b

A mixture of Int-2a (commercially available, 4.24 g, 34.7 mmol) and triethylamine (229.0 g, 2258 mmol) in dichloromethane (2000 mL) was treated with 4-methylbenzene-1-sulfonyl chloride (397.0 g, 2085 mmol). The reaction mixture was stirred for 16 hours at room temperature. The reaction was quenched with saturated, aqueous NH₄Cl (1000 mL) and then extracted with dichloromethane, washed with brine, dried over Na₂SO₄, and concentrated in vacuo. The residue was purified using silica gel chromatography eluting with 30-60% EtOAc/petroleum ether to provide Int-2b. MS: m/z 270.1=[M+H].

Step B—Synthesis of Int-2

A mixture of Int-2b (40.0 g, 134 mmol), lithium bromide (58.0 g, 668 mmol), and acetone (800 mL) was stirred for 16 hours at 60° C. The reaction was concentrated in vacuo, diluted with water (500 mL), and extracted with ethyl acetate. The organic extract was washed with saturated, aqueous sodium thiosulfate (2×500 mL) and water (1000 mL), dried over Na₂SO₄, and concentrated in vacuo to provide Int-2 which was used without further purification. MS: m/z 178.0 and 180.0=[M+H for ⁷⁹Br and ⁸¹Br].

Example 3

Preparation of Compound 1

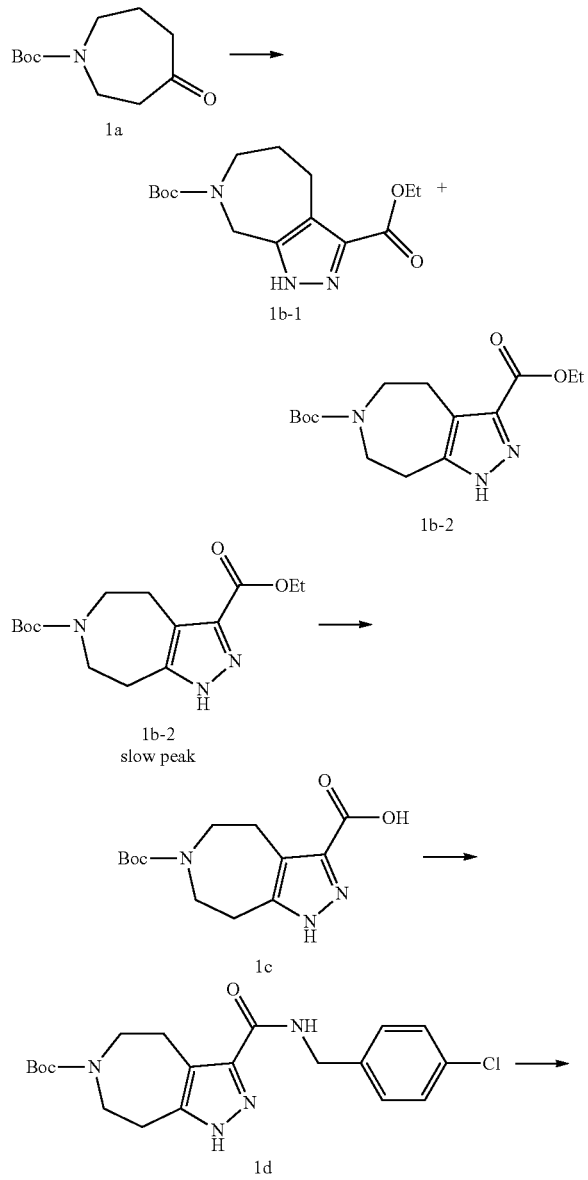

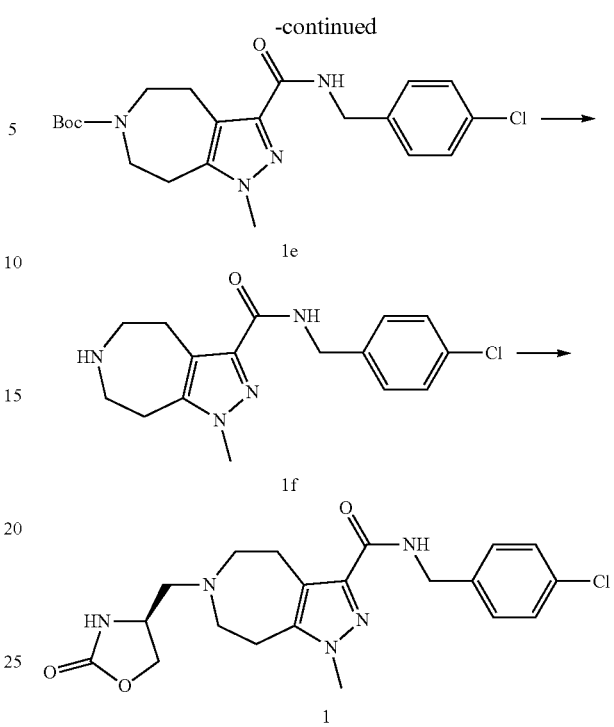

Step A—Synthesis of Compounds 1b-1 and 1b-2

To a solution of N-Boc-hexahydro-1h-azepin-4-one (55a, 2.50 g, 11.7 mmol) in DMSO (11.7 ml) was added ethyl diazoacetate (1.216 ml, 11.72 mmol), followed by pyrrolidine (0.504 ml, 6.10 mmol). The resulting reaction was allowed to stir for about 15 hours at room temperature, then the reaction mixture was diluted with saturated, aqueous NaHCO₃. The resulting solution was extracted with ethyl acetate, and the organic extract was washed with brine, dried over MgSO₄, filtered and concentrated in vacuo. The resulting residue was purified using silica gel chromatography eluting with 0-75% EtOAc/hexanes to provide compounds 1b-1 (fast peak) and 1b-2 (slow peak), both as oils. For compound 1b-2: MS: m/z 310.2=[M+H].

Step B—Synthesis of Compound 1c

To a solution of 1b-2 (257 mg) in THF (4.15 mL) and water (4.15 mL) was added lithium hydroxide monohydrate (105 mg, 2.49 mmol), and the resulting reaction was allowed to stir at room temperature for 3 hours. Additional lithium hydroxide (140 mg) was added and stirring continued overnight. Additional water (1 mL) and methanol (1 mL) were then added, followed by addition of more lithium hydroxide (105 mg). The reaction was allowed to stir for 5 hours, and additional water (5 mL), THF (2 mL), and lithium hydroxide (105 mg) were added and the reaction was allowed to stir for about 15 hours. The reaction mixture was concentrated in vacuo, and the residue obtained was acidified by addition of concentrated hydrochloric acid. The resulting solution was extracted with ethyl acetate, and the organic extract was washed with brine, dried over MgSO₄, filtered and concentrated to provide compound 1c as a semi-solid. MS: m/z 282.2=[M+H].

Step C—Synthesis of Compound 1d

A mixture of 1c (987 mg) and 2-(3H-[1,2,3]triazolo[4,5-b]pyridin-3-yl)-1,1,3,3-tetramethylisouronium hexafluorophosphate (V) (HATU, 2106 mg, 5.54 mmol) in DMF (30 mL) was allowed to stir for 30 minutes at room temperature. (4-Chlorophenyl)methanamine (1.05 g, 7.39 mmol) and triethylamine (561 mg, 5.54 mmol) were then added, and the resulting reaction was allowed to stir for 6 hours at room temperature, then quenched with saturated aqueous Na₂CO₃ (50 mL). The resulting solution was extracted with ethyl acetate, and the organic extract was washed with brine, dried over Na₂SO₄, filtered, and concentrated. The residue obtained was purified using silica gel chromatography eluting with 3-5% MeOH/CH₂Cl₂ to provide 1d. MS: m/z 405.2=[M+H].

Step D—Synthesis of Compound 1e

To a mixture of 1d (3.50 g, 8.95 mmol) and tribasic potassium phosphate (2.85 g, 13.4 mmol) in DMF (34.4 ml) was added iodomethane (0.59 mL, 9.4 mmol), and the resulting reaction was heated at 70° C., and allowed to stir at this temperature for 2 hours. The reaction mixture was diluted with water and extracted with ethyl acetate, and the organic extract was dried over MgSO₄, filtered and concentrated in vacuo. The resulting residue was slurried in ethyl acetate (60 mL) overnight, then filtered, and the collected solid was washed with minimal ethyl acetate and dried in vacuo to provide a first crop of 1e as a solid. The filtrate was concentrated in vacuo and slurried in ethyl acetate (20 mL) for 1.5 hours, then filtered and the collected solid was washed with minimal ethyl acetate and dried in vacuo to provide a second crop of 1e as a solid. The combined products were then purified using silica gel chromatography eluting with 0-80% EtOAc/hexanes to provide 1e as a solid. MS: m/z 419.2=[M+H].

Step E—Synthesis of Compound 1f

A solution of 1e (2.42 g, 5.98 mmol) in dichloromethane (15 mL) was cooled to −78° C. and hydrochloric acid (4 M in dioxane, 15 mL) was added. The resulting reaction was allowed to warm to room temperature and stirred at this temperature for about 15 hours. The reaction mixture was concentrated in vacuo, and the resulting residue was taken up in ethyl acetate. The resulting solution was made slightly basic by addition of 1 N NaOH, then extracted with ethyl acetate. The organic extract was washed with brine, dried over MgSO₄, filtered, and concentrated in vacuo to provide 1f as a solid which was used without further purification. MS: m/z 319.2=[M+H].

Step F—Synthesis of Compound 1

A mixture of 1f (1.00 g, 2.43 mmol), Int-1 (0.438 g, 2.43 mmol), and potassium carbonate (0.673 g, 4.87 mmol) in DMF (12 mL) was allowed to stir for 4 hours at 80° C. The reaction was quenched with water (50 mL), extracted with ethyl acetate, and the organic extract was washed with brine, dried over Na₂SO₄, filtered, and concentrated in vacuo. The resulting residue was purified using preparative HPLC (reverse-phase C-18), eluting with acetonitrile/water+0.1% TFA 10-50% to provide 1. MS: m/z 418.2=[M+H]. ¹H NMR (500 MHz, CDCl₃, ppm): δ 7.27 (dd, J=12.5, 2.0 Hz, 4H), 7.21 (t, J=5.0 Hz, 1H), 5.39 (br s, 1H), 4.48-4.53 (m, 3H), 4.07-4.10 (m, 1H), 3.96-4.01 (m, 1H), 3.74 (s, 3H), 3.19-3.23 (m, 1H), 3.10-3.14 (m, 1H), 2.91-2.93 (m, 2H), 2.87-2.90 (m, 1H), 2.76-2.82 (m, 4H), 2.66 (dd, J=10.5, 7.5 Hz 1H).

The following compound of the present invention was made using the methodology described in Example 3, Step F above, utilizing 1f as starting material and substituting Int-2 for Int-1:

| Compound | Structure | MS [M + H] |
|---|---|---|
| 2 | 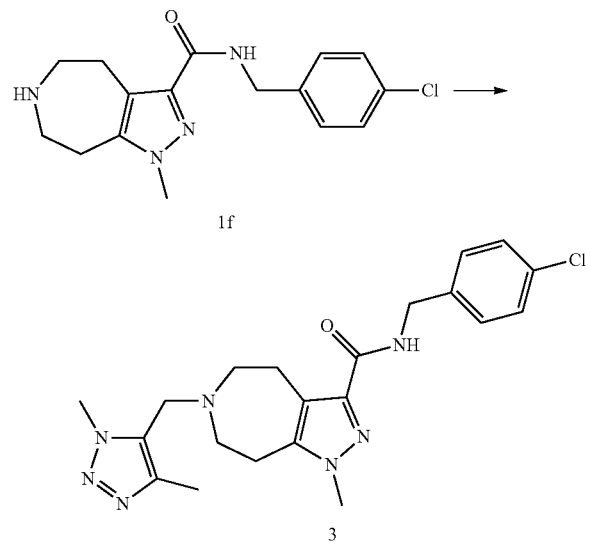 | 416.3 |

Example 4

Preparation of Compound 3

To a solution of 1f (457 mg, 1.50 mmol) in dichloroethane (20.9 mL) and acetic acid (0.21 mL) was added 1,4-dimethyl-1H-1,2,3-triazole-5-carbaldehyde (563 mg, 4.50 mmol), and the resulting reaction was allowed to stir at room temperature for 30 minutes. Sodium triacetoxyborohydride (1.11 g, 5.25 mmol) was added, and the reaction was allowed to stir overnight with the reaction flask being open to the air. The reaction mixture was then azeotroped once with heptane to remove bulk acetic acid, and the resulting residue was purified using preparative HPLC (reverse-phase C-18), eluting with acetonitrile/water+0.1% TFA 10-45%. Fractions containing the target were combined, basified with saturated aqueous NaHCO₃, and extracted with ethyl acetate. The organic extract was washed with brine, dried over MgSO₄, filtered, and concentrated in vacuo to provide 3 as a solid. MS: m/z=428.2.

Example 5

HCMV and VZV Polymerase Assays

Human cytomegalovirus (HCMV) and varicella zoster virus (VZV) DNA polymerases were expressed via baculovirus vector in SF21 cells and purified. Heterodimeric nucleic acid substrate used in the herpesvirus polymerase reactions was generated by annealing a 59-mer template to a 17-mer digoxigenin-labeled primer. Polymerase (HCMV final concentration of 0.2 nM; VZV final concentration of 0.4 nM) was combined with an inhibitor compound or DMSO in assay buffer (10 mM HEPES, pH 7.5, 25 mM KCl, 25 mM NaCl, 5 mM $MgCl_2$, 5% glycerol, 0.67 mg/ml bovine serum albuminutes (albuminate?), and 1 mM tris(2-carboxyethyl)phosphine), and this mixture was pre-incubated for 30 minutes at room temperature in 384-well microtiter plates. The polymerization reaction was initiated by the addition of template/primer substrate (final concentration: 1.6 nM), and dNTPs (final concentration: 24 nM dCTP, 24 nMdGTP, 16 nM dATP, 16 nM dTTP, and 0.8 nM biotin-dUTP). After 60 minutes incubation at 37° C., reactions were terminated with quench buffer (25 mM HEPES pH 7.5, 100 mM NaCl, 0.25% Tween-20, 12 mM EDTA, and 1 mg/ml bovine serum albumin). Incorporation of biotinylated UTP was detected with 2.5-5 ug/ml anti-DIG AlphaLISA acceptor beads and 5-10 ug/ml streptavidin AlphaLISA donor beads (Perkin Elmer). Compound effects were normalized to the window defined by the controls (DMSO only and pre-quenched wells), and were fit using a 4-parameter algorithm to report an $IC_{50}$.

Example 6

Viral qPCR Assays

Viral qPCR Assays (V0/V1)

MRC5 cells, Vero cells, and MeWo cells were obtained from ATCC and were maintained at 37° C./5% CO2/90% relative humidity in Minimal Essential Medium with 10% fetal bovine serum, 2.0 nM L-glutamine, 100 units/ml penicillin and 100 ug/ml streptomycin. Assay plates were prepared by dispensing compounds dissolved in DMSO into wells of 384 well collagen-coated plates using an ECHO acoustic dispenser. Each compound was tested in a 10-point, serial 3-fold dilution. Controls included uninfected cells and infected cells treated only with DMSO. Assays were initiated by mixing selected cells, in suspension, with virus, and dispensing 50 µl/well infected cells to pre-plated compounds. Plates were incubated at 37° C./5% CO2/90% relative humidity for ~72 hrs to permit genomic replication, and infected cells were lysed by the addition of an equal volume of lysis buffer (10 mM Tris-HCl, pH8, 50 mM KCl, 2 mM $MgCl_2$, 0.45% NP-40, 0.45% Tween-20, and 100 µg/ml proteinase K). An aliquot of the lysate was transferred to a 384-well PCR plate and incubated at 56° C. for 1 hour and then at 95° C. for 10 min. Levels of a viral gene and of the cellular control, PPIA (Thermo Fisher Assay ID=Hs04194521_s1), were measured in separate 10 µL qPCR assays using TaqMang Gene Expression Master Mix (Applied Biosystems), and an 7900HT Fast Real-Time PCR System with 384-Well Block Module. 7-point, serial 10-fold dilutions of a plasmid standard were run on each plate to generate a standard curve, and genome copies numbers were calculated by plotting experimental Ct onto linear regression of the standard curve. Viral genome copy numbers were normalized by cellular control copy number, and compound effects were normalized to the window defined by the controls. Calculated % effects were fit using a 4-parameter algorithm, and $EC_{50}$ was reported.

Viral qPCR Assays (V2/V3)

MRC5 cells, Vero cells, and MeWo cells were obtained from ATCC and were maintained at 37° C./5% CO2/90% relative humidity in Minimal Essential Medium with 10% fetal bovine serum, 2.0 nM L-glutamine, 100 units/ml penicillin and 100 ug/ml streptomycin. Assay plates were prepared by dispensing compounds dissolved in DMSO into wells of 384 well collagen-coated plates using an ECHO acoustic dispenser. Each compound was tested in a 10-point, serial 3-fold dilution. Controls included uninfected cells and infected cells treated only with DMSO. Assays were initiated by mixing selected cells, in suspension, with virus, and dispensing 50 µl/well infected cells to pre-plated compounds. Plates were incubated at 37° C./5% CO2/90% relative humidity for ~72 hrs to permit genomic replication, and infected cells were lysed by the addition of an equal volume of lysis buffer (10 mM Tris-HCl, pH8, 50 mM KCl, 2 mM $MgCl_2$, 0.45% NP-40, 0.45% Tween-20, and 100 µg/ml proteinase K). An aliquot of the lysate was transferred to a 384-well PCR plate and incubated at 56° C. for 1 hour and then at 95° C. for 10 min. Levels of a viral gene were measured in 10 µL qPCR assays using TaqMang Gene Expression Master Mix (Applied Biosystems), and an 7900HT Fast Real-Time PCR System with 384-Well Block Module. 7-point, serial 10-fold dilutions of a plasmid standard were run on each plate to generate a standard curve, and genome copies numbers were calculated by plotting experimental Ct onto linear regression of the standard curve. Compound effects on viral genome copy number were normalized to the window defined by the controls. Calculated % effects were fit using a 4-parameter algorithm, and $EC_{50}$ was reported.

- HCMV: Strain AD169 Street was assayed in MRC-5 cells and was used at 0.05-0.1 pfu/cell. The assays were performed in either growth media or in the same media with 50% fetal bovine serum. Primer-probe set was Thermo Fisher Assay ID=AIFATFK.
- VZV: Strain Street was maintained as an infected cell stock in MRC-5 cells. It was assayed in MeWo or MRC5 cells and was used at 0.04-0.1 pfu/cell. The assays were performed in growth medium. Primer-probe set was Thermo Fisher Assay ID=AIPAEXQ.
- HSV-1: Strain F Street was assayed in Vero or MRC5 cells and was used at 0.0005-0.004 pfu/cell in growth medium. Primer-probe set was Thermo Fisher Assay ID=AIBJZIB Illustrative compounds of the present invention were tested in one or more of the above assays and results (in nM) are provided in the table below (blank boxes indicate data is not available):

| Compound | $CMV^a$ ($IC_{50}$) | $VZV^a$ ($IC_{50}$) | CMV MRC5 $Cell^b$ ($EC_{50}$) | VZV MEWO $Cell^b$ ($IC_{50}$) | HSV1 VERO $Cell^b$ ($EC_{50}$) | HSV2 VERO $Cell^b$ ($EC_{50}$) |
|---|---|---|---|---|---|---|
| 1 | 802.3 | 259.9 | 3723 | 1958 | 3293 | 7973 |
| 2 | 761.5 | 251.2 | 8678 | 2990 | 3269 | 5684 |
| 3 | 805 | 373 | 12370 | 1442 | 4580 | 7822 |

N/A = not available
[a] data generated using the assay described in Example 6
[b] data generated using the assay described in Example 5

Uses of the Fused [7,5] Bicyclic Pyrazole Derivatives

The Fused [7,5] Bicyclic Pyrazole Derivatives are useful in human and veterinary medicine for treating or preventing a viral infection in a patient. In one embodiment, the Fused [7,5] Bicyclic Pyrazole Derivatives can be inhibitors of viral replication. In another embodiment, the Fused [7,5] Bicyclic Pyrazole Derivatives can be inhibitors of herpesvirus replication. Accordingly, the Fused [7,5] Bicyclic Pyrazole Derivatives are useful for treating viral infections, such as herpesvirus. In accordance with the invention, the Fused [7,5] Bicyclic Pyrazole Derivatives can be administered to a patient in need of treatment or prevention of a viral infection.

Accordingly, in one embodiment, the invention provides methods for treating or preventing a viral infection in a patient comprising administering to the patient an effective amount of at least one Fused [7,5] Bicyclic Pyrazole Derivative or a pharmaceutically acceptable salt thereof.

Treatment or Prevention of Herpesvirus Infection

The Fused [7,5] Bicyclic Pyrazole Derivatives are useful in the inhibition of herpesvirus replication, the treatment of herpesvirus infection and/or reduction of the likelihood or severity of symptoms of herpesvirus infection and the inhibition of herpesvirus viral replication and/or herpesvirus viral production in a cell-based system. For example, the Fused [7,5] Bicyclic Pyrazole Derivatives are useful in treating infection by herpesvirus after suspected past exposure to herpesvirus by such means as blood transfusion, exchange of body fluids, bites, accidental needle stick, or exposure to patient blood during surgery or other medical procedures. Accordingly, in one embodiment, the invention provides a method for treating herpesvirus infection in a patient, the method comprising administering to the patient an effective amount of at least one Fused [7,5] Bicyclic Pyrazole Derivative or a pharmaceutically acceptable salt thereof.

In one embodiment, the herpesvirus being treated or prevented is of the family α-herpesviridae. Herpesviruses of the family α-herpesviridae include, but are not limited to, herpes simplex virus 1 (HSV-1), herpes simplex 2 (HSV-2), and varicella zoster virus (VZV).

In another embodiment, the herpesvirus being treated or prevented is of the family β-herpesviridae. Herpesviruses of the family β-herpesviridae include, but are not limited to, human cytomegalovirus (CMV), human herpesvirus 6 (HHV6), and human herpesvirus 7 (HHV7).

In another embodiment, the herpesvirus being treated or prevented is of the family γ-herpesviridae. Herpesviruses of the family γ-herpesviridae include, but are not limited to, Epstein-Barr virus (EBV), human herpesvirus 4 (HHV4), and Kaposi's sarcoma-associated herpesvirus (KHSV), also known as human herpesvirus 8 (HHV8).

In one embodiment, the herpesvirus being treated or prevented is HSV-1.

In another embodiment, the herpesvirus being treated or prevented is HSV-2.

In another embodiment, the herpesvirus being treated or prevented is VZV.

In still another embodiment, the herpesvirus being treated or prevented is CMV.

In another embodiment, the herpesvirus being treated or prevented is HHV6.

In yet another embodiment, the herpesvirus being treated or prevented is HHV7.

In another embodiment, the herpesvirus being treated or prevented is EBV.

In a further embodiment, the herpesvirus being treated or prevented is HHV4.

In another embodiment, the herpesvirus being treated or prevented is KSHV.

In a specific embodiment, the amount administered is effective to treat or prevent infection by herpesvirus in the patient. In another specific embodiment, the amount administered is effective to inhibit herpesvirus viral replication and/or viral production in the patient.

The Fused [7,5] Bicyclic Pyrazole Derivatives are also useful in the preparation and execution of screening assays for antiviral compounds. Furthermore, the Fused [7,5] Bicyclic Pyrazole Derivatives are useful in establishing or determining the binding site of other antivirals to the herpesvirus polymerase.

The compositions and combinations of the present invention can be useful for treating a patient suffering from infection related to any herpesvirus infection. Herpesvirus types may differ in their antigenicity, level of viremia, severity of disease produced, and response to therapy. See Poole et al., Clinical Therapeutics, 40:8 (2018), 1282-1298.

Combination Therapy

In another embodiment, the present methods for treating or preventing herpesvirus infection can further comprise the administration of one or more additional therapeutic agents which are not Fused [7,5] Bicyclic Pyrazole Derivatives.

In one embodiment, the additional therapeutic agent is an antiviral agent. In another embodiment, the additional therapeutic agent is an anti-herpes agent.

Anti-herpes agents useful in the present compositions and methods include, but are not limited to, nucleoside polymerase inhibitors, such as acyclovir, valaciclovir, famciclovir, penciclovir, cidofovir, brincidofovir (CMX-001), valmanciclovir, ganciclovir, valganciclovir, and N-methanocarbathymidine (N-MCT); pyrophosphate polymerase inhibitors, such as foscarnet; CMV terminase inhibitors, such as letermovir; viral kinase inhibitors, such as maribavir; and helicase-primase inhibitors, such as pritelivir (AIC-316), and amenamevir (ASP-2151).

In another embodiment, the additional therapeutic agent is an immunomodulatory agent, such as an immunosuppressive agent. Immunosuppressant agents useful in the present compositions and methods include, but are not limited to, cytotoxic agents, such as cyclophosphamide and cyclosporin A; corticosteroids, such as hydrocortisone and dexamethasone, and non-steroidal anti-inflammatory agents (NSAID).

Accordingly, in one embodiment, the present invention provides methods for treating a herpesvirus infection in a patient, the method comprising administering to the patient: (i) at least one Fused [7,5] Bicyclic Pyrazole Derivative, or a pharmaceutically acceptable salt thereof, and (ii) at least one additional therapeutic agent that is other than a Fused [7,5] Bicyclic Pyrazole Derivative, wherein the amounts administered are together effective to treat or prevent the herpesvirus infection.

When administering a combination therapy of the invention to a patient, therapeutic agents in the combination, or a pharmaceutical composition or compositions comprising therapeutic agents, may be administered in any order such as, for example, sequentially, concurrently, together, simultaneously and the like. The amounts of the various actives in such combination therapy may be different amounts (different dosage amounts) or same amounts (same dosage amounts). Thus, for non-limiting illustration purposes, a Fused [7,5] Bicyclic Pyrazole Derivative and an additional therapeutic agent may be present in fixed amounts (dosage amounts) in a single dosage unit (e.g., a capsule, a tablet and the like).

In one embodiment, the at least one Fused [7,5] Bicyclic Pyrazole Derivative is administered during a time when the additional therapeutic agent(s) exert their prophylactic or therapeutic effect, or vice versa.

In another embodiment, the at least one Fused [7,5] Bicyclic Pyrazole Derivative and the additional therapeutic agent(s) are administered in doses commonly employed when such agents are used as monotherapy for treating a herpesvirus infection.

In another embodiment, the at least one Fused [7,5] Bicyclic Pyrazole Derivative and the additional therapeutic agent(s) are administered in doses lower than the doses commonly employed when such agents are used as monotherapy for treating a herpesvirus infection.

In still another embodiment, the at least one Fused [7,5] Bicyclic Pyrazole Derivative and the additional therapeutic agent(s) act synergistically and are administered in doses lower than the doses commonly employed when such agents are used as monotherapy for treating a herpesvirus infection.

In one embodiment, the at least one Fused [7,5] Bicyclic Pyrazole Derivative and the additional therapeutic agent(s) are present in the same composition. In one embodiment, this composition is suitable for oral administration. In another embodiment, this composition is suitable for intravenous administration. In another embodiment, this composition is suitable for subcutaneous administration. In still another embodiment, this composition is suitable for parenteral administration.

The at least one Fused [7,5] Bicyclic Pyrazole Derivative and the additional therapeutic agent(s) can act additively or synergistically. A synergistic combination may allow the use of lower dosages of one or more agents and/or less frequent administration of one or more agents of a combination therapy. A lower dosage or less frequent administration of one or more agents may lower toxicity of therapy without reducing the efficacy of therapy.

In one embodiment, the administration of at least one Fused [7,5] Bicyclic Pyrazole Derivative and the additional therapeutic agent(s) may inhibit the resistance of a herpesvirus infection to these agents.

The doses and dosage regimen of the other agents used in the combination therapies of the present invention for the treatment or prevention of herpesvirus infection can be determined by the attending clinician, taking into consideration the approved doses and dosage regimen in the package insert; the age, sex and general health of the patient; and the type and severity of the viral infection or related disease or disorder. When administered in combination, the Fused [7,5] Bicyclic Pyrazole Derivative(s), and the other agent(s) can be administered simultaneously (i.e., in the same composition or in separate compositions one right after the other) or sequentially. This is particularly useful when the components of the combination are given on different dosing schedules, e.g., one component is administered once daily and another component is administered every six hours, or when the preferred pharmaceutical compositions are different, e.g., one is a tablet and one is a capsule. A kit comprising the separate dosage forms is therefore advantageous.

In one embodiment, one or more compounds of the present invention are administered with one or more additional therapeutic agents selected from: an immunomodulator, an anti-herpes agent, a viral replication inhibitor, an antisense agent, a therapeutic vaccine, a virion production inhibitor, a viral entry inhibitor, a viral assembly inhibitor, an antibody therapy (monoclonal or polyclonal), and any agent useful for treating any type of herpesvirus infection.

Compositions and Administration

Due to their activity, the Fused [7,5] Bicyclic Pyrazole Derivatives are useful in veterinary and human medicine. As described above, the Fused [7,5] Bicyclic Pyrazole Derivatives are useful for treating or preventing herpesvirus infection in a patient in need thereof.

Accordingly, in one embodiment, the present invention provides pharmaceutical compositions comprising an effective amount of a compound of formula(I), or a pharmaceutically acceptable salt thereof, and a pharmaceutically acceptable carrier.

In another embodiment, the present invention provides pharmaceutical compositions comprising (i) an effective amount of a compound of formula(I), or a pharmaceutically acceptable salt thereof, and a pharmaceutically acceptable carrier; and (ii) one or more additional therapeutic agents, wherein said additional therapeutic agents are selected from anti-herpes agents and immunomodulators.

When administered to a patient, the Fused [7,5] Bicyclic Pyrazole Derivatives can be administered as a component of a composition that comprises a pharmaceutically acceptable carrier or vehicle. The present invention provides pharmaceutical compositions comprising an effective amount of at least one Fused [7,5] Bicyclic Pyrazole Derivative and a pharmaceutically acceptable carrier. In the pharmaceutical compositions and methods of the present invention, the active ingredients will typically be administered in admixture with suitable carrier materials suitably selected with respect to the intended form of administration, i.e., oral tablets, capsules (either solid-filled, semi-solid filled or liquid filled), powders for constitution, oral gels, elixirs, dispersible granules, syrups, suspensions, and the like, and consistent with conventional pharmaceutical practices. For example, for oral administration in the form of tablets or capsules, the active drug component may be combined with any oral non-toxic pharmaceutically acceptable inert carrier, such as lactose, starch, sucrose, cellulose, magnesium stearate, dicalcium phosphate, calcium sulfate, talc, mannitol, ethyl alcohol (liquid forms), and the like. Solid form preparations include powders, tablets, dispersible granules, capsules, cachets and suppositories. Powders and tablets may be comprised of from about 0.5 to about 95 percent inventive composition. Tablets, powders, cachets and capsules can be used as solid dosage forms suitable for oral administration.

Moreover, when desired or needed, suitable binders, lubricants, disintegrating agents and coloring agents may also be incorporated in the mixture. Suitable binders include starch, gelatin, natural sugars, corn sweeteners, natural and synthetic gums such as acacia, sodium alginate, carboxymethylcellulose, polyethylene glycol and waxes. Among the lubricants there may be mentioned for use in these dosage forms, boric acid, sodium benzoate, sodium acetate, sodium chloride, and the like. Disintegrants include starch, methylcellulose, guar gum, and the like. Sweetening and flavoring agents and preservatives may also be included where appropriate.

Liquid form preparations include solutions, suspensions and emulsions and may include water or water-propylene glycol solutions for parenteral or intravenous injection.

Also included are solid form preparations which are intended to be converted, shortly before use, to liquid form preparations for either oral or parenteral administration. Such liquid forms include solutions, suspensions and emulsions.

For preparing suppositories, a low melting wax such as a mixture of fatty acid glycerides or cocoa butter is first melted, and the active ingredient is dispersed homogeneously therein as by stirring. The molten homogeneous mixture is then poured into convenient sized molds, allowed to cool and thereby solidify.

Additionally, the compositions of the present invention may be formulated in sustained release form to provide the rate-controlled release of any one or more of the components or active ingredients to optimize therapeutic effects, i.e., antiviral activity and the like. Suitable dosage forms for sustained release include layered tablets containing layers of varying disintegration rates or controlled release polymeric matrices impregnated with the active components and shaped in tablet form or capsules containing such impregnated or encapsulated porous polymeric matrices.

In one embodiment, the one or more Fused [7,5] Bicyclic Pyrazole Derivatives are administered orally.

In another embodiment, the one or more Fused [7,5] Bicyclic Pyrazole Derivatives are administered intravenously.

In still another embodiment, the one or more Fused [7,5] Bicyclic Pyrazole Derivatives are administered sublingually.

In one embodiment, a pharmaceutical preparation comprising at least one Fused [7,5] Bicyclic Pyrazole Derivative is in unit dosage form. In such form, the preparation is subdivided into unit doses containing effective amounts of the active components.

Compositions can be prepared according to conventional mixing, granulating or coating methods, respectively, and the present compositions can contain, in one embodiment, from about 0.1% to about 99% of the Fused [7,5] Bicyclic Pyrazole Derivative(s) by weight or volume. In various embodiments, the present compositions can contain, in one embodiment, from about 1% to about 70% or from about 5% to about 60% of the Fused [7,5] Bicyclic Pyrazole Derivative(s) by weight or volume.

The amount and frequency of administration of the Fused [7,5] Bicyclic Pyrazole Derivatives will be regulated according to the judgment of the attending clinician considering such factors as age, condition and size of the patient as well as severity of the symptoms being treated. Generally, a total daily dosage of the at least one Fused [7,5] Bicyclic Pyrazole Derivative(s) alone, or when administered as combination therapy, can range from about 1 to about 2500 mg per day, although variations will necessarily occur depending on the target of therapy, the patient and the route of administration. In one embodiment, the dosage is from about 10 to about 1000 mg/day, administered in a single dose or in 2-4 divided doses. In another embodiment, the dosage is from about 1 to about 500 mg/day, administered in a single dose or in 2-4 divided doses. In still another embodiment, the dosage is from about 1 to about 100 mg/day, administered in a single dose or in 2-4 divided doses. In yet another embodiment, the dosage is from about 1 to about 50 mg/day, administered in a single dose or in 2-4 divided doses. In another embodiment, the dosage is from about 500 to about 1500 mg/day, administered in a single dose or in 2-4 divided doses. In still another embodiment, the dosage is from about 500 to about 1000 mg/day, administered in a single dose or in 2-4 divided doses. In yet another embodiment, the dosage is from about 100 to about 500 mg/day, administered in a single dose or in 2-4 divided doses.

The compositions of the invention can further comprise one or more additional therapeutic agents, selected from those listed above herein. Accordingly, in one embodiment, the present invention provides compositions comprising: (i) at least one Fused [7,5] Bicyclic Pyrazole Derivative or a pharmaceutically acceptable salt thereof; (ii) one or more additional therapeutic agents that are not a Fused [7,5] Bicyclic Pyrazole Derivative; and (iii) a pharmaceutically acceptable carrier, wherein the amounts in the composition are together effective to treat herpesvirus infection.

In one embodiment, the present invention provides compositions comprising a Compound of Formula (I), and a pharmaceutically acceptable carrier.

In another embodiment, the present invention provides compositions comprising a Compound of Formula (I), a pharmaceutically acceptable carrier, and a second therapeutic agent selected from the group consisting of anti-herpes agents and immunomodulators.

In another embodiment, the present invention provides compositions comprising a Compound of Formula (I), a pharmaceutically acceptable carrier, and two additional therapeutic agents, each of which are independently selected from the group consisting of anti-herpes agents and immunomodulators.

Kits

In one aspect, the present invention provides a kit comprising a therapeutically effective amount of at least one Fused [7,5] Bicyclic Pyrazole Derivative, or a pharmaceutically acceptable salt, solvate, ester or prodrug of said compound and a pharmaceutically acceptable carrier, vehicle or diluent.

In another aspect the present invention provides a kit comprising an amount of at least one Fused [7,5] Bicyclic Pyrazole Derivative, or a pharmaceutically acceptable salt, solvate, ester or prodrug of said compound and an amount of at least one additional therapeutic agent listed above, wherein the amounts of the two or more active ingredients result in a desired therapeutic effect. In one embodiment, the one or more Fused [7,5] Bicyclic Pyrazole Derivatives and the one or more additional therapeutic agents are provided in the same container. In one embodiment, the one or more Fused [7,5] Bicyclic Pyrazole Derivatives and the one or more additional therapeutic agents are provided in separate containers.

What is claimed is:

1. A compound having of the formula (I):

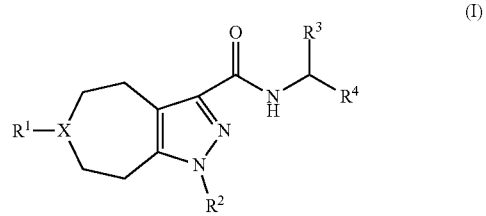

or a pharmaceutically acceptable salt thereof,
wherein:
X is N or C(R$^5$);
R$^1$ is —(C$_1$-C$_6$ alkylene)-(4 to 7-membered monocyclic heterocycloalkyl), or —(C$_1$-C$_6$ alkylene)-(5 or 6-membered monocyclic heteroaryl), wherein said 4 to 7-membered monocyclic heterocycloalkyl group, and said 5 or 6-membered monocyclic heteroaryl group, can each be optionally substituted with one or more RA groups, which can be the same or different;
R$^2$ is selected from C$_1$-C$_6$ alkyl, C$_3$-C$_6$ monocyclic cycloalkyl, —(C$_1$-C$_6$ alkylene)-N(R$^6$)$_2$, C$_1$-C$_6$ haloalkyl, and C$_1$-C$_6$ hydroxyalkyl, wherein said $C_3$-$C_6$ monocyclic cycloalkyl group can be optionally substituted with one or more $R^B$ groups, which can be the same or different;

$R^3$ is H or $C_1$-$C_6$ alkyl;

$R^4$ is phenyl, which can be optionally substituted with one or more groups, which can be the same or different, and are selected from: halo, CN, and $NO_2$;

$R^5$ is selected from H, $C_1$-$C_6$ alkyl and —OH;

each occurrence of $R^6$ is independently selected from H, $C_1$-$C_6$ alkyl, and —C(O)$R^7$;

each occurrence of $R^7$ is independently selected from H, $C_1$-$C_6$ alkyl, and $C_3$-$C_6$ monocyclic cycloalkyl, wherein $C_3$-$C_6$ monocyclic cycloalkyl can be optionally substituted with a group selected from $C_1$-$C_6$ alkyl, halo, and —OH;

each occurrence of $R^A$ is independently selected from oxo, halo, and $C_1$-$C_6$ alkyl; and each occurrence of $R^B$ is independently selected from $C_1$-$C_6$ alkyl, —OH, —O—($C_1$-$C_6$ alkyl), halo, —$C_1$-$C_6$ haloalkyl, phenyl, and —$C_1$-$C_6$ hydroxyalkyl.

2. The compound of claim 1, or a pharmaceutically acceptable salt thereof, wherein X is N.

3. The compound of claim 1, or a pharmaceutically acceptable salt thereof, wherein X is CH.

4. The compound of claim 1, or a pharmaceutically acceptable salt thereof, wherein $R^1$ is selected from:

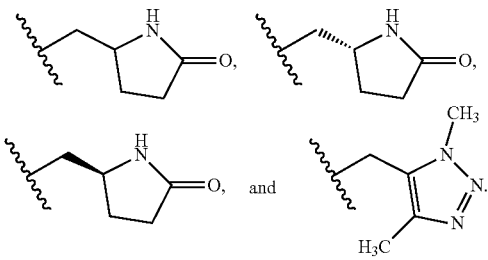

5. The compound of claim 1, or a pharmaceutically acceptable salt thereof, wherein $R^2$ is selected from H, methyl, ethyl, isopropyl, —$CHF_2$, —$CH_2CH(OH)CH(CH_3)_2$, —$CH_2C(OH)(CH_3)_2$, —$CH_2CH_2NHC(O)CH(CH_3)_2$, —$CH_2CH_2NHC(O)$-cyclobutanyl, —$CH_2CH_2N(CH_3)C(O)$-cyclobutanyl, and —$CH_2CH_2N(CH_3)C(O)$-cyclopropanyl, wherein said cyclopentanyl group, said cyclobutanyl group, and said cyclopropanyl group can be optionally substituted with one or more of the following groups, which can be the same or different: F, Cl, methyl, ethyl, isopropyl, isobutyl, t-butyl, methoxy, ethoxy, —OH, —$CH_2OH$, —$CH_2F$, and phenyl.

6. The compound of claim 5, or a pharmaceutically acceptable salt thereof, wherein $R^2$ is methyl.

7. The compound of claim 1, or a pharmaceutically acceptable salt thereof, wherein $R^3$ is H.

8. The compound of claim 1, or a pharmaceutically acceptable salt thereof, wherein $R^4$ is phenyl substituted with one or more of the following groups, which can be the same or different: F, Cl and CN.

9. The compound of claim 8, or a pharmaceutically acceptable salt thereof, wherein $R^4$ is:

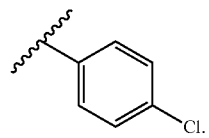 [SMILES: *c1ccc(Cl)cc1]

10. The compound of claim 1, or a pharmaceutically acceptable salt thereof, wherein $R^5$ is H.

11. A compound selected from:

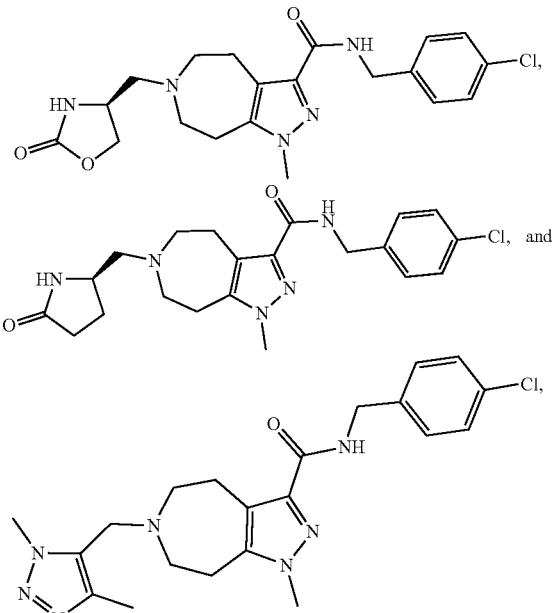

or a pharmaceutically acceptable salt thereof.

12. A pharmaceutical composition comprising an effective amount of the compound of claim 1, or a pharmaceutically acceptable salt thereof, and a pharmaceutically acceptable carrier.

13. The pharmaceutical composition of claim 12 further comprising one or more additional therapeutic agents, wherein said additional therapeutic agents are selected from anti-herpes agents, and immunomodulators.

14. A method of treating a patient infected with a herpesvirus, comprising the step of administering an amount of the compound of claim 1, or a pharmaceutically acceptable salt thereof, effective to treat infection by said herpesvirus in said patient.

15. The method of claim 14, further comprising administering one or more additional therapeutic agents, wherein said additional therapeutic agents are selected from anti-herpes agents, and immunomodulators.

16. The pharmaceutical composition of claim 13, wherein said additional therapeutic agents comprise letermovir.

17. The method of claim 15, wherein said additional therapeutic agents comprise letermovir.

* * * * *